US012603998B2

(12) United States Patent
Li et al.

(10) Patent No.: US 12,603,998 B2
(45) Date of Patent: Apr. 14, 2026

(54) CONFIGURABLE NEURAL NETWORK MODEL DEPTH IN NEURAL NETWORK-BASED VIDEO CODING

(71) Applicant: Lemon, Inc., Grand Cayman (KY)

(72) Inventors: Yue Li, San Diego, CA (US); Kai Zhang, San Diego, CA (US); Li Zhang, San Diego, CA (US)

(73) Assignee: Lemon Inc.

( * ) Notice: Subject to any disclaimer, the term of this patent is extended or adjusted under 35 U.S.C. 154(b) by 306 days.

(21) Appl. No.: 17/848,068

(22) Filed: Jun. 23, 2022

(65) Prior Publication Data

US 2023/0023579 A1      Jan. 26, 2023

Related U.S. Application Data

(60) Provisional application No. 63/219,328, filed on Jul. 7, 2021.

(51) Int. Cl.
*H04N 19/117*      (2014.01)
*H04N 19/105*      (2014.01)
*H04N 19/176*      (2014.01)
*H04N 19/80*      (2014.01)

(52) U.S. Cl.
CPC ......... *H04N 19/117* (2014.11); *H04N 19/105* (2014.11); *H04N 19/176* (2014.11); *H04N 19/80* (2014.11)

(58) Field of Classification Search
None
See application file for complete search history.

(56) References Cited

U.S. PATENT DOCUMENTS

| | | | |
|---|---|---|---|
| 11,631,199 B2 * | 4/2023 | Ikai | H04N 19/176 |
| | | | 382/232 |
| 12,095,988 B2 | 9/2024 | Li | |
| 2011/0091127 A1 | 4/2011 | Kisilev | |
| 2018/0192050 A1 | 7/2018 | Zhang | |

(Continued)

FOREIGN PATENT DOCUMENTS

| | | |
|---|---|---|
| CN | 107925762 A | 4/2018 |
| CN | 108184129 A | 6/2018 |

(Continued)

OTHER PUBLICATIONS

Li, "AHG11: Deep in-loop filter with adaptive model selection", Joint Video Experts Team (JVET) of ITU-T SG 16 WP 3 and ISO/IEC JTC 1/SC 29 22nd Meeting, by teleconference, Apr. 20-28, 2021, 5 pages (Year: 2021).*

(Continued)

*Primary Examiner* — Jessica M Prince
(74) *Attorney, Agent, or Firm* — Conley Rose, P.C.

(57)      ABSTRACT

A method implemented by a video coding apparatus includes applying a neural network (NN) filter to an unfiltered sample of a video unit to generate a filtered sample, where the NN filter is based on a first NN filter model having a first depth, or a second NN filter model having a second depth, where the depth comprises a number of residual blocks of the respective NN filter model, and where the second depth is different than the first depth. The method also includes performing a conversion between a video media file and a bitstream based on the filtered sample.

19 Claims, 21 Drawing Sheets

2200

Apply a neural network (NN) filter to an unfiltered sample of a video unit to generate a filtered sample, where the NN filter is based on an NN filter model having a depth that is configurable, where the depth is a number of residual blocks of the NN filter model — 2202

Convert between a video media file and a bitstream based on the filtered sample — 2204

(56) References Cited

U.S. PATENT DOCUMENTS

| | | | |
|---|---|---|---|
| 2020/0120340 A1 | 4/2020 | Park | |
| 2021/0012537 A1* | 1/2021 | Xu | H04N 19/136 |
| 2021/0021823 A1 | 1/2021 | Na | |
| 2021/0100451 A1* | 4/2021 | Cao | A61B 5/7475 |
| 2022/0014787 A1* | 1/2022 | Yoo | H04N 19/124 |
| 2022/0021905 A1* | 1/2022 | Ma | H04N 19/124 |
| 2022/0103864 A1 | 3/2022 | Wang | |
| 2022/0215593 A1* | 7/2022 | Wang | H04N 19/157 |
| 2022/0295116 A1 | 9/2022 | Ma | |
| 2022/0321919 A1 | 10/2022 | Deshpande | |
| 2023/0288910 A1* | 9/2023 | Chen | G06T 3/4046 |
| 2023/0336788 A1 | 10/2023 | Zhang | |
| 2024/0015284 A1 | 1/2024 | Wang | |

FOREIGN PATENT DOCUMENTS

| | | | | |
|---|---|---|---|---|
| CN | 111222558 A | 6/2020 | | |
| CN | 111711824 A | 9/2020 | | |
| CN | 112261414 A | 1/2021 | | |
| WO | WO-2022147494 A1 * | 7/2022 | | H04N 19/90 |

OTHER PUBLICATIONS

Ma, et al., "BVI-DVC: A Training Database for Deep Video Compression" Oct. 8, 2020; p. 1-11 (Year: 2020).*

Non-Final Office Action from U.S. Appl. No. 17/874,817 dated Nov. 21, 2023, 22 pages.

Non-Final Office Action from U.S. Appl. No. 17/848,054 dated Feb. 1, 2024, 19 pages.

Bross, B., et al., "Versatile Video Coding (Draft 10)," Retrieved from the internet: http://phenix.it-sudparis.eu/jvet/doc_end_user/current_document.php?id=10399, Sep. 16, 2022, 1 page.

Suehring, K., Retrieved from the internet: https://vcgit.hhi.fraunhofer.de/jvet/VVCSoftware_VTM/-/tags/VTM-10.0, Sep. 16, 2022, 2 pages.

Document: JVET-L0147, Lim, S-C., et al., "CE2: Subsampled Laplacian calculation (Test 6.1, 6.2, 6.3, and 6.4)," Joint Video Experts Team (JVET) of ITU-T SG 16 WP 3 and ISO/IEC JTC 1/SC 29/WG 11 12th Meeting: Macao, CN, Oct. 3-12, 2018, 8 pages.

Document: JVET-N0242, "CE5: Results of tests CE5-3.1 to CE5-3.4 on Non-Linear Adaptive Loop Filter.," Joint Video Experts Team (JVET) of ITU-T SG 16 WP 3 and ISO/IEC JTC 1/SC 29/WG 11 14th Meeting: Geneva, CH, Mar. 19-27, 2019, 10 pages.

Ballé, J., et al., "End-to-end optimization of nonlinear transform codes for perceptual quality," arXiv:1607.05006v2 [cs.IT], Picture Coding Symposium, Oct. 17, 2016, 5 pages.

Theis, L., et al., "Lossy image compression with compressive autoencoders," arXiv:1703.00395 [stat.ML] ICLR 2017, Mar. 1, 2017, 19 pages.

Li, J., et al., "Fully Connected Network-Based Intra Prediction for Image Coding," IEEE Transactions on Image Processing 27, 7, 2018, pp. 3236-3247.

Dai, Y., et al., "A convolutional neural network approach for post-processing in HEVC intra coding," arXiv:1608.6690v2, In MMM. Springer, Oct. 29, 2016, pp. 28-39.

Song, R., et al., "Neural network-based arithmetic coding of intra prediction modes in HEVC," In VCIP, arXiv:1709.05737v1, IEEE, Sep. 18, 2017, pp. 1-4.

Pfaff, J., "Neural network based intra prediction for video coding," In Applications of Digital Image Processing XLI, vol. 10752, International Society for Optics and Photonics, 1075213, 2018, 7 pages.

Document: JVET-V0100, Li, Y., et al., "AHG11: Deep in-loop filter with adaptive model selection," Joint Video Experts Team (JVET) of ITU-T SG 16 WP 3 and ISO/IEC JTC 1/SC 29 22nd Meeting, by teleconference, Apr. 20-28, 2021, 5 pages.

Document: JVET-V2016-v3, "JVET common test conditions and evaluation procedures for neural network-based video coding technology," Joint Video Experts Team (JVET) of ITU-T SG 16 WP 3 and ISO/IEC JTC 1/SC 29, 22nd Meeting, by teleconference, Apr. 20-28, 2021, 10 pages.

Timofte, R., et al., "DIV2K dataset: DIVerse 2K resolution high quality images as used for the challenges @ Ntire (CVPR 2017)," Retrieved from the Internet: https://data.vision.ee.ethz.ch/cvl/DIV2K/, Sep. 16, 2022, 6 pages.

Ma, D., et al., "BVI-DVC: A Training Database for Deep Video Compression." arXiv:2003.13552v1 [eess.IV] Mar. 30, 2020, 19 pages.

Bossen, F., Retrieved from the Internet: https://vcgit.hhi.fraunhofer.de/jvet/VVCSoftware_VTM/-/tags/VTM-11.0, Sep. 16, 2022, 1 page.

Retrieved from the Internet: https://vcgit.hhi.fraunhofer.de/jvet-ahg-nnvc/nnvc-ctc/-/tree/master/Software%20Patches, Sep. 19, 2022, 2 pages.

Non-Final Office Action from U.S. Appl. No. 17/874,817 dated Sep. 10, 2024, 20 pages.

Final Office Action from U.S. Appl. No. 17/874,817 dated Apr. 9, 2024, 18 pages.

Wang, M-Z., et al., "Attention-Based Dual-Scale CNN In-Loop Filter for Versatile Video Coding," Digital Object Identifier 10.1109/ACCESS.2019.2944473, vol. 7, 2019, 13 pages.

Ma, D., et al., "BVI-DVC: A Training Database for Deep Video Compression," arXiv:2003.13552v2 [eess.IV] Oct. 8, 2020, 11 pages.

Office Action from Chinese Patent Application No. 202210803985.6 dated Feb. 9, 2025, 25 pages.

Office Action from Chinese Patent Application No. 202210771651.5 dated Apr. 11, 2025, 14 pages.

Bross B., et al., "Versatile Video Coding (Draft 10)," Joint Video Experts Team (JVET) of ITU-T SG 16 WP 3 and ISO/IEC JTC 1/SC29/WG 11, 19th Meeting: by Teleconference, Jun. 22-Jul. 1, 2020, Document: JVET-S2001-v1, 526 Pages.

Machine Translation of CN-111711824 (Year: 2020).

Non-Final Office Action from U.S. Appl. No. 17/848,068 dated Jun. 21, 2024, 21 pages.

"Video Coding Standardization Gitlab," Sep. 19, 2022, 2 Pages, Retrieved from URL: https://vcgit.hhi.fraunhofer.de/jvet-ahg-nnvc/nnvc-ctc/-/tree/master/Software%20Patches.

* cited by examiner

100

CTU

106

Tile

102

Slice

104

200

400

N

M 402     402

400

N

M

402

402

400

N

M

402

700

800

900

1100

Residual block

1300

1600

1650

Attention Residual block

1800

1802

Processor

1806

Video Processing
Circuitry

1804

Memory

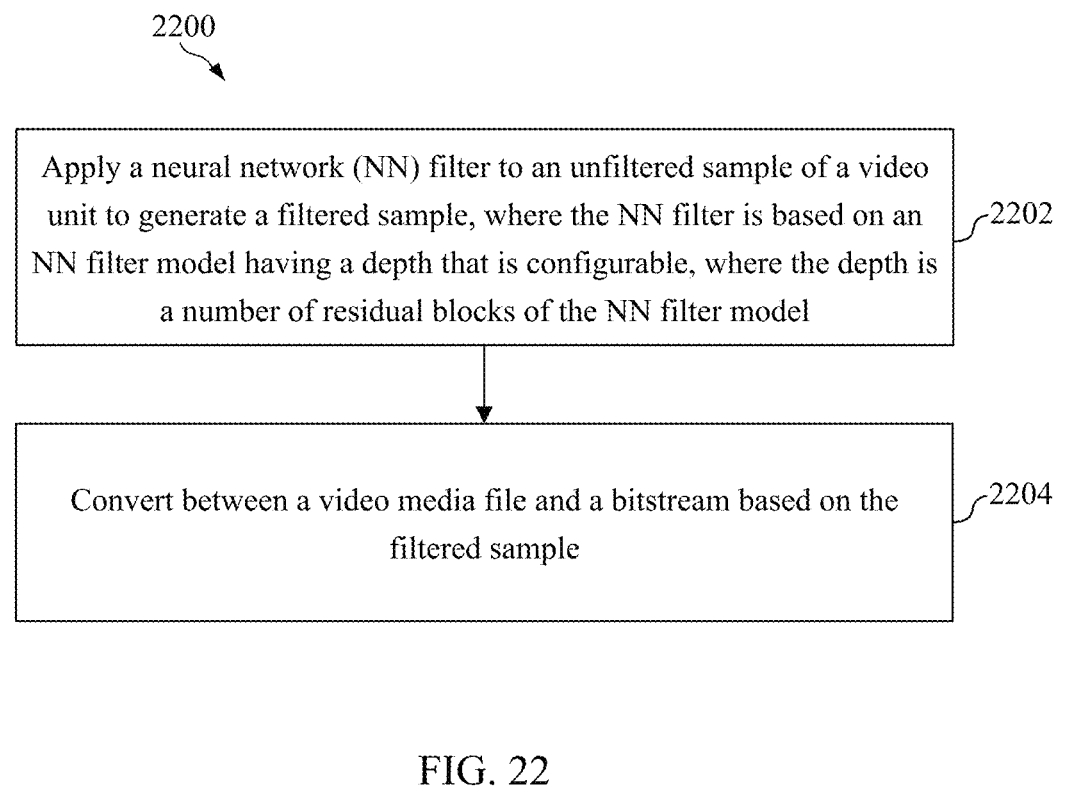

2200

Apply a neural network (NN) filter to an unfiltered sample of a video
unit to generate a filtered sample, where the NN filter is based on an
NN filter model having a depth that is configurable, where the depth is
a number of residual blocks of the NN filter model
⌐2202

Convert between a video media file and a bitstream based on the
filtered sample
⌐2204

FIG. 22

CONFIGURABLE NEURAL NETWORK MODEL DEPTH IN NEURAL NETWORK-BASED VIDEO CODING

CROSS-REFERENCE TO RELATED APPLICATIONS

This patent application claims the benefit of U.S. Provisional Patent Application No. 63/219,328 filed Jul. 7, 2021, by Lemon, Inc., and titled "External Attenuation In Neural Network-Based Coding Tools For Video Coding," which is hereby incorporated by reference.

TECHNICAL FIELD

The present disclosure is generally related to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide one or more neural network (NN) filter models trained as coding tools to improve the efficiency of video coding. The NN-based coding tools may be used to replace or enhance one or more modules implemented by a video coder/decoder (a.k.a., codec). For example, a NN model can be trained to provide an additional intra prediction mode, an additional inter prediction mode, a transform kernel, and/or a loop filter. Further, a NN model can be generated or designed by using external information, such as prediction, split, a quantization parameter (QP), and the like, as attention mechanism(s).

A first aspect relates to a method implemented by a coding apparatus. The method includes applying a neural network (NN) filter to an unfiltered sample of a video unit to generate a filtered sample, wherein the NN filter is based on a first NN filter model having a first depth, or a second NN filter model having a second depth, wherein the depth comprises a number of residual blocks of the respective NN filter model, and wherein the second depth is different than the first depth. The method also includes performing a conversion between a video media file and a bitstream based on the filtered sample.

Optionally, in any of the preceding aspects, another implementation of the aspect provides that the video unit is a first video unit, when the NN filter is applied to the first video unit, the NN filter uses the first NN filter model, and when the NN filter is applied to a second video unit, the NN filter uses the second NN filter model.

Optionally, in any of the preceding aspects, another implementation of the aspect provides determining whether to use the first or second NN filter model based on a temporal layer of the video unit, a type of a slice or a picture that contains the video unit, a list of reference pictures that are matched to the video unit, a color component of the video unit, a color format of the video unit, or combinations thereof.

Optionally, in any of the preceding aspects, another implementation of the aspect provides that the NN filter uses the first NN filter model for a first video unit in a picture or a slice, and NN filter uses the second NN filter model for a second video unit in the picture or the slice.

Optionally, in any of the preceding aspects, another implementation of the aspect provides that the NN filter uses the first NN filter model for a first video unit in a first picture or a first slice, and the NN filter uses the second NN filter model for a second video unit in a second picture or a second slice.

Optionally, in any of the preceding aspects, another implementation of the aspect provides that the NN filter uses the first NN filter model for a first video unit in a first temporal layer or a first type of slice, and the NN filter uses the second NN filter model for a second video unit in a second temporal layer or a second type of slice.

Optionally, in any of the preceding aspects, another implementation of the aspect provides that the NN filter uses the first NN filter model for a third video unit in a third temporal layer, the first temporal layer and the third temporal layer are in a same subgroup of temporal layers, and the second temporal layer is in a different subgroup of temporal layers.

Optionally, in any of the preceding aspects, another implementation of the aspect provides that determining whether to use the first or second NN filter model is based on whether the video unit is a coding tree unit (CTU), a coding tree block (CTB), a row of a CTU, a row of a CTB, a slice, a tile, a picture, a sequence, or a subpicture.

Optionally, in any of the preceding aspects, another implementation of the aspect provides that the NN filter uses the first NN filter model for a first video unit in a first temporal layer, the NN filter uses the second NN filter model for a second video unit in a second temporal layer, and the first temporal layer is a higher temporal layer than the second temporal layer.

Optionally, in any of the preceding aspects, another implementation of the aspect provides that the first depth is 8.

Optionally, in any of the preceding aspects, another implementation of the aspect provides that the NN filter uses the first NN filter model for a first video unit in an inter slice, and the NN filter uses the second NN filter model for a second video unit in an intra slice.

Optionally, in any of the preceding aspects, another implementation of the aspect provides the first depth is 8 and the second depth is 32.

Optionally, in any of the preceding aspects, another implementation of the aspect provides signaling the depth of a NN filter model to be used to a decoder using one selected from the group consisting of: a supplemental enhancement information (SEI) message, a sequence parameter set (SPS), a picture parameter set (PPS), an adaptation parameter set (APS), a video parameter set (VPS), a picture header, and a slice header.

Optionally, in any of the preceding aspects, another implementation of the aspect provides signaling the depth of the first NN filter model to a decoder for a first video unit, and signaling the depth of the second NN filter model to the decoder for a second video unit.

Optionally, in any of the preceding aspects, another implementation of the aspect provides that the unfiltered sample comprises a luma component and a chroma component, and the method further comprises signaling a different depth to a decoder for the luma component than for the chroma component.

Optionally, in any of the preceding aspects, another implementation of the aspect provides that the NN filter is one or more selected from a group consisting of: an adaptive loop filter, a deblocking filter, and a sample adaptive offset filter.

Optionally, in any of the preceding aspects, another implementation of the aspect provides that the conversion comprises generating the bitstream according to the video media file.

Optionally, in any of the preceding aspects, another implementation of the aspect provides that the conversion comprises parsing the bitstream to obtain the video media file.

A second aspect relates to an apparatus for coding video data comprising a processor and a non-transitory memory with instructions thereon, wherein the instructions upon execution by the processor cause the processor to: apply a neural network (NN) filter to an unfiltered sample of a video unit to generate a filtered sample, wherein the NN filter is based on a first NN filter model having a first depth, or a second NN filter model having a second depth, wherein the depth comprises a number of residual blocks of the respective NN filter model, and wherein the second depth is different than the first depth; and convert between a video media file and a bitstream based on the filtered sample that was generated.

A third aspect relates to a non-transitory computer readable medium storing a bitstream of a video that is generated by a method performed by a video processing apparatus. The method performed by the video processing apparatus applying a neural network (NN) filter to an unfiltered sample of a video unit to generate a filtered sample, wherein the NN filter is based on a first NN filter model having a first depth, or a second NN filter model having a second depth, wherein the depth comprises a number of residual blocks of the respective NN filter model, and wherein the second depth is different than the first depth; and generating the bitstream based on the filtered sample that was generated.

A fourth aspect relates to a method for storing a bitstream of a video that is performed by a video processing apparatus. The method performed by the video processing apparatus includes applying a neural network (NN) filter to an unfiltered sample of a video unit to generate a filtered sample, wherein the NN filter is based on a first NN filter model having a first depth, or a second NN filter model having a second depth, wherein the depth comprises a number of residual blocks of the respective NN filter model, and wherein the second depth is different than the first depth; and generating the bitstream based on the filtered sample that was generated.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

4

Figure 3:
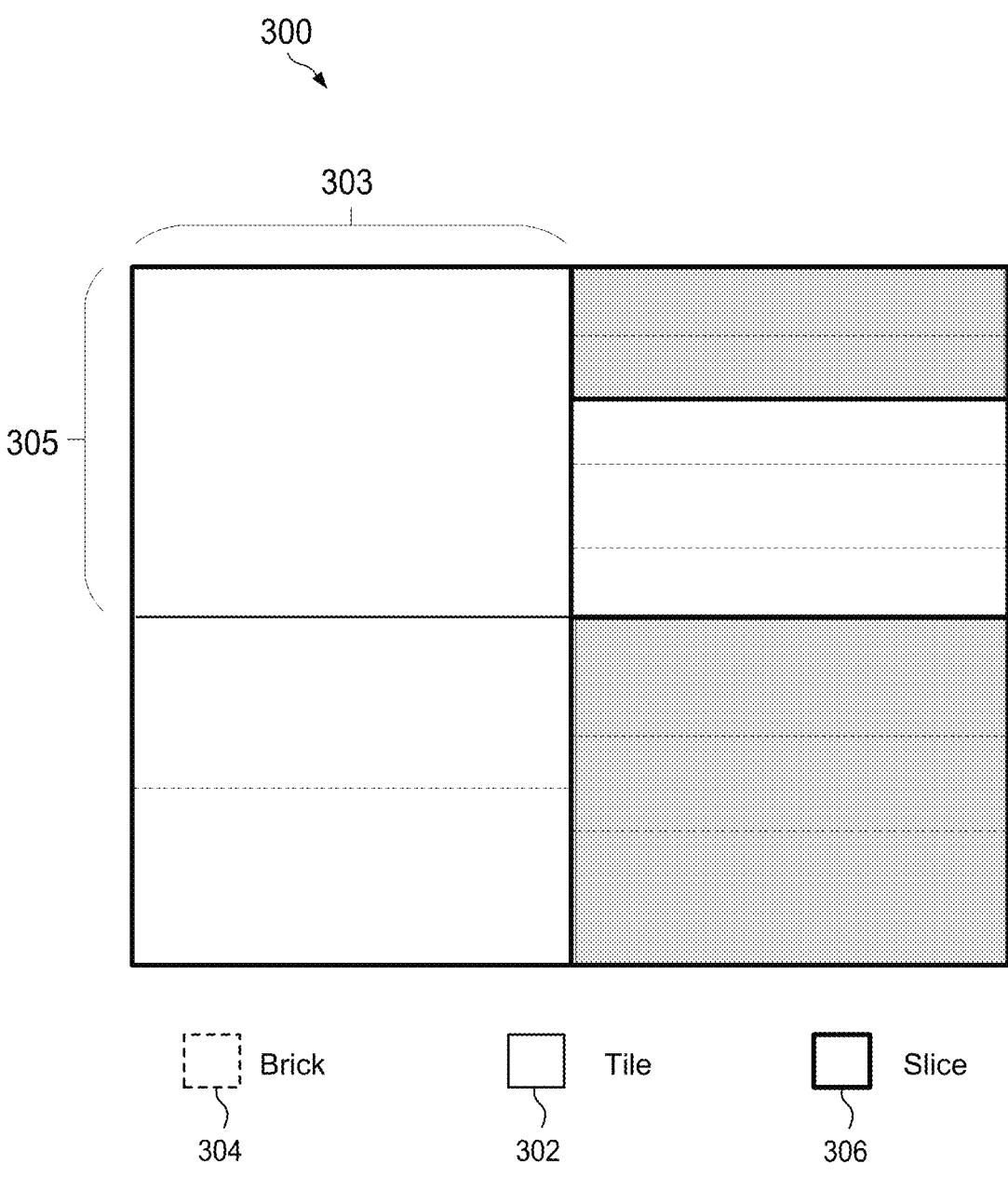

FIG. 3 is an example of a picture partitioned into tiles, bricks, and rectangular slices.

Figure 4A:
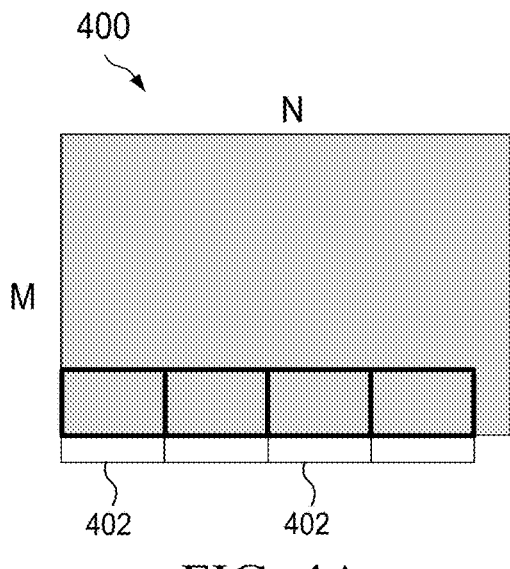

FIG. 4A is an example of coding tree blocks (CTBs) crossing the bottom picture border.

Figure 4B:
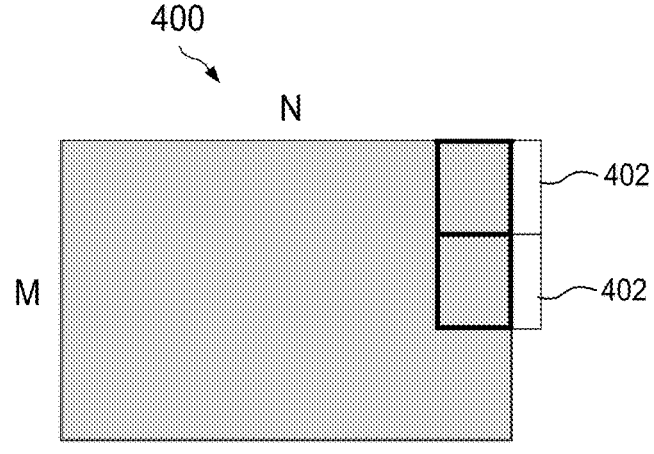

FIG. 4B is an example of CTBs crossing the right picture border.

Figure 4C:
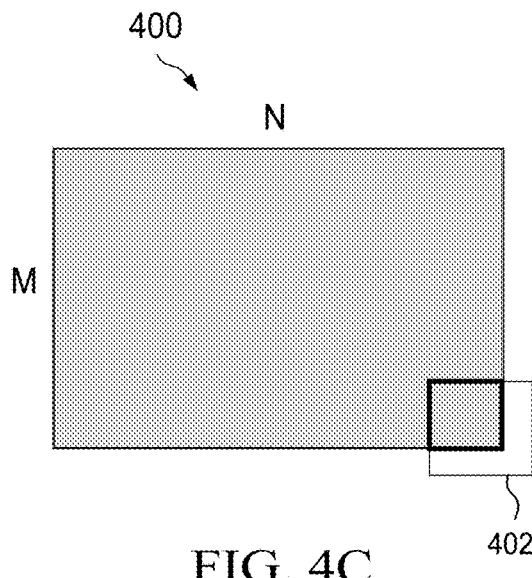

FIG. 4C is an example of CTBs crossing the right bottom picture border.

Figure 5:
Figure 5:
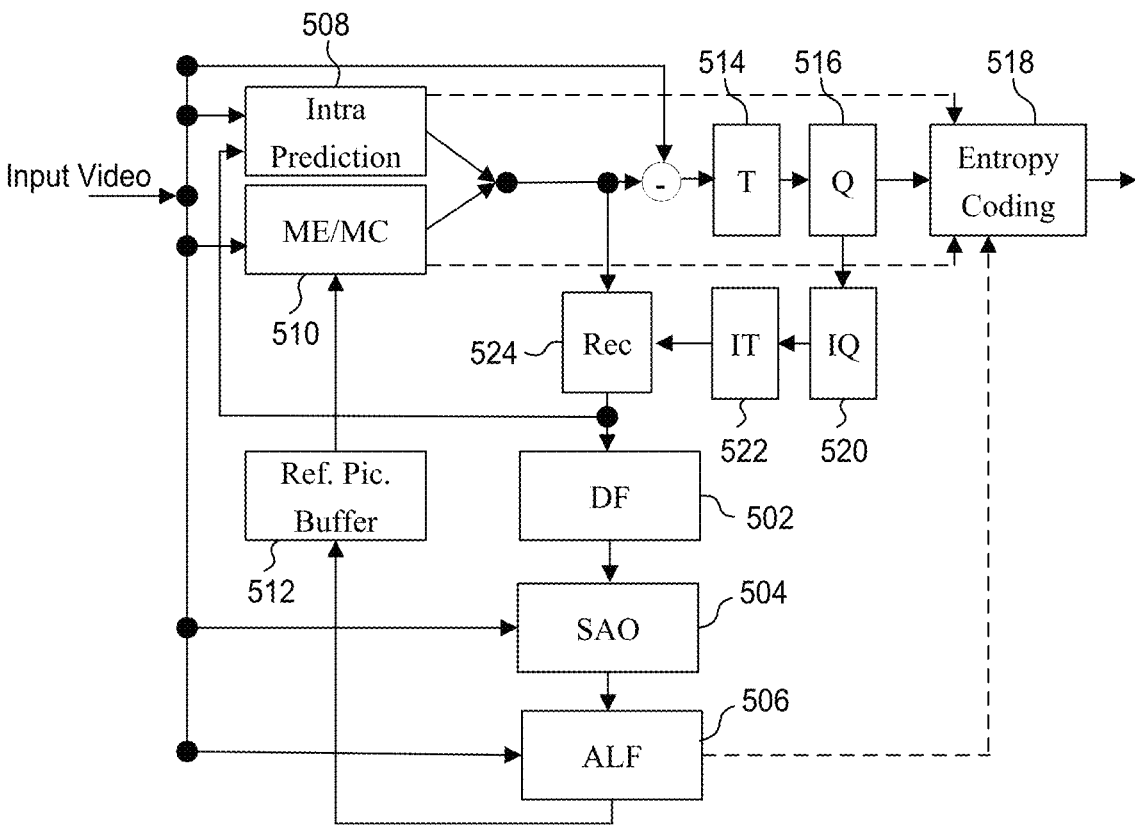

FIG. 5 is an example of encoder block diagram.

Figure 6:
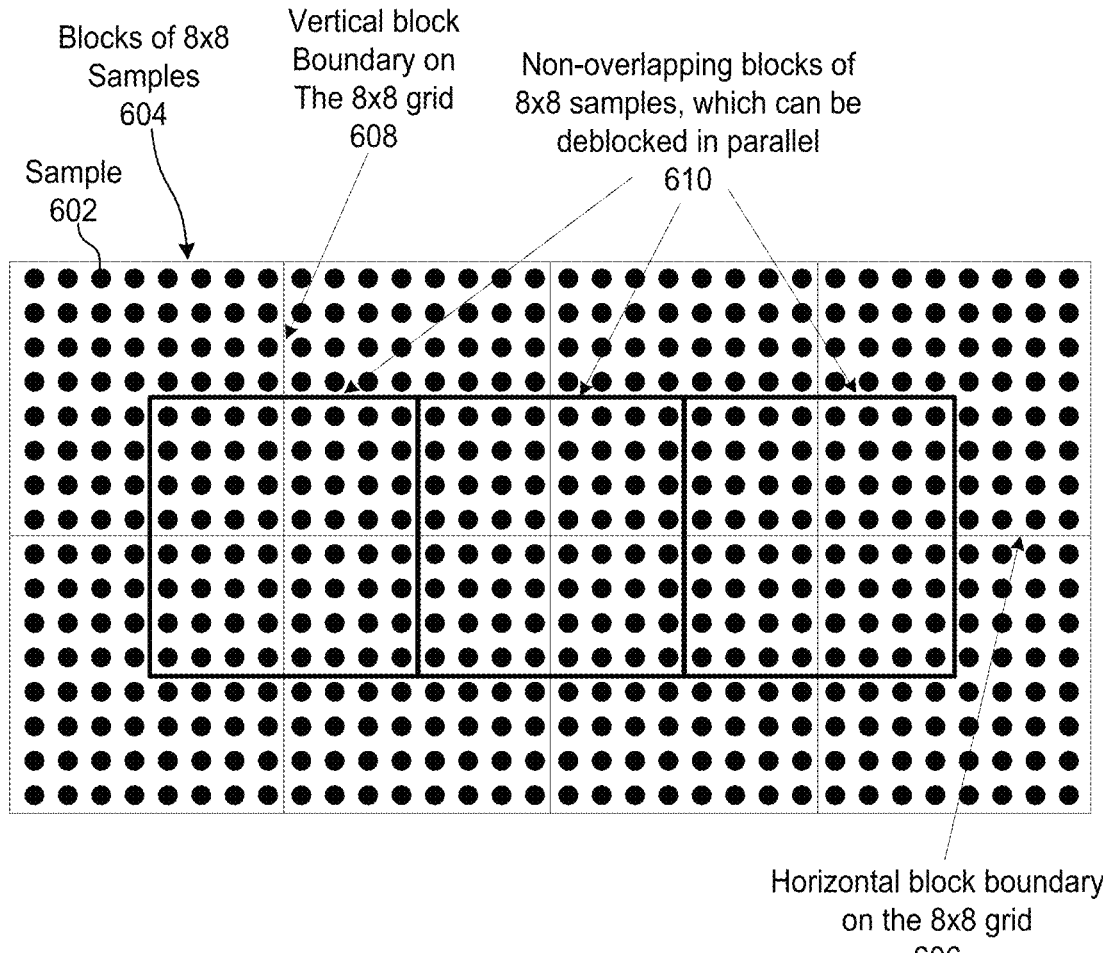

FIG. 6 is an illustration of samples within 8×8 blocks of samples.

Figure 7:
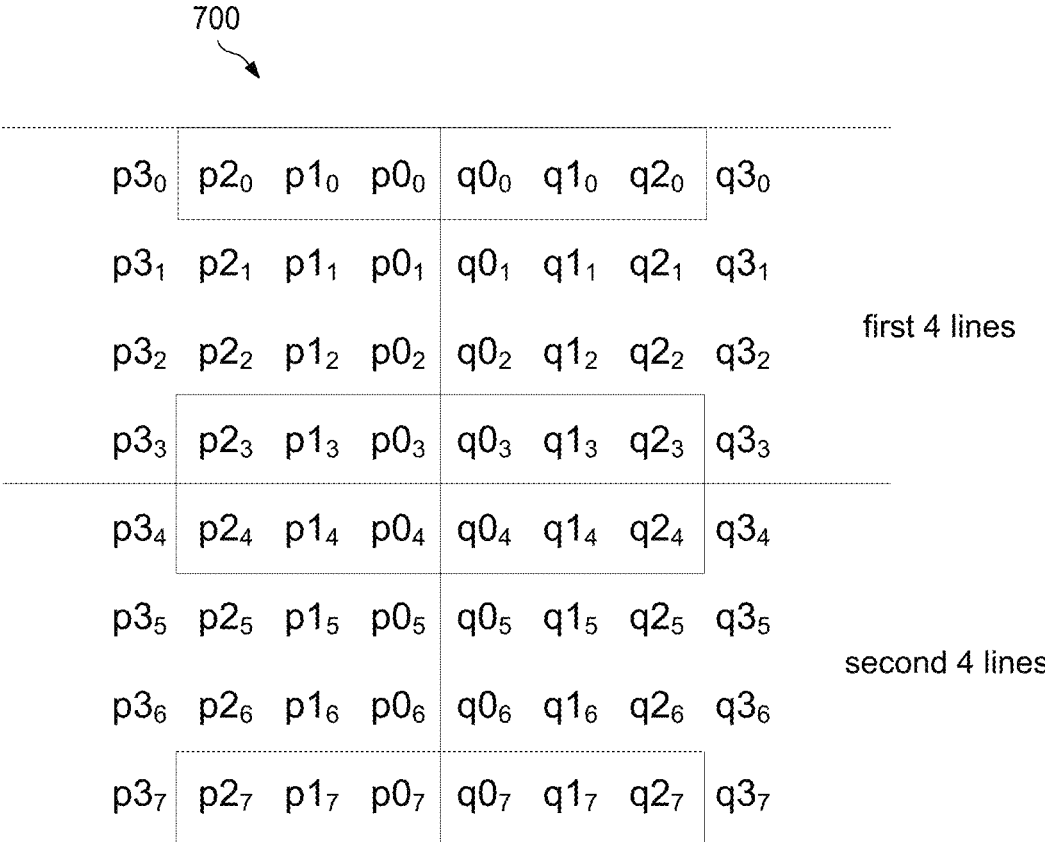

FIG. 7 is an example of pixels involved in filter on/off decision and strong/weak filter selection.

Figure 8:
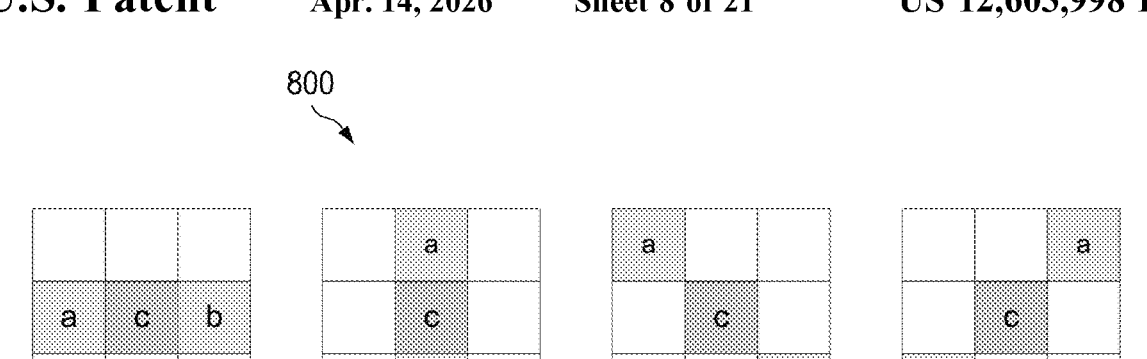

FIG. 8 shows four one dimensional (1-D) directional patterns for EO sample classification.

Figure 9:
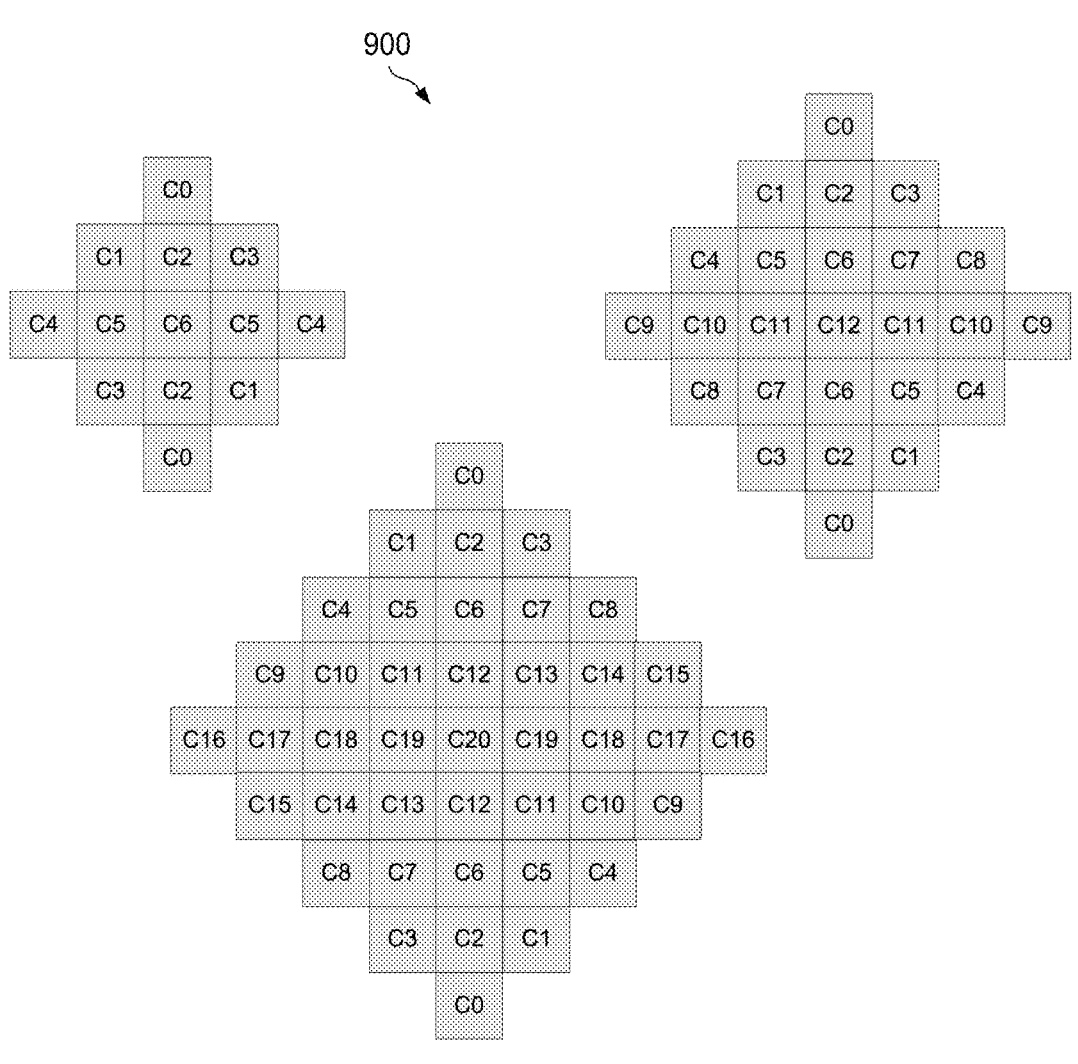

FIG. 9 shows examples of geometry transformation-based adaptive loop filter (GALF) filter shapes.

Figure 10:
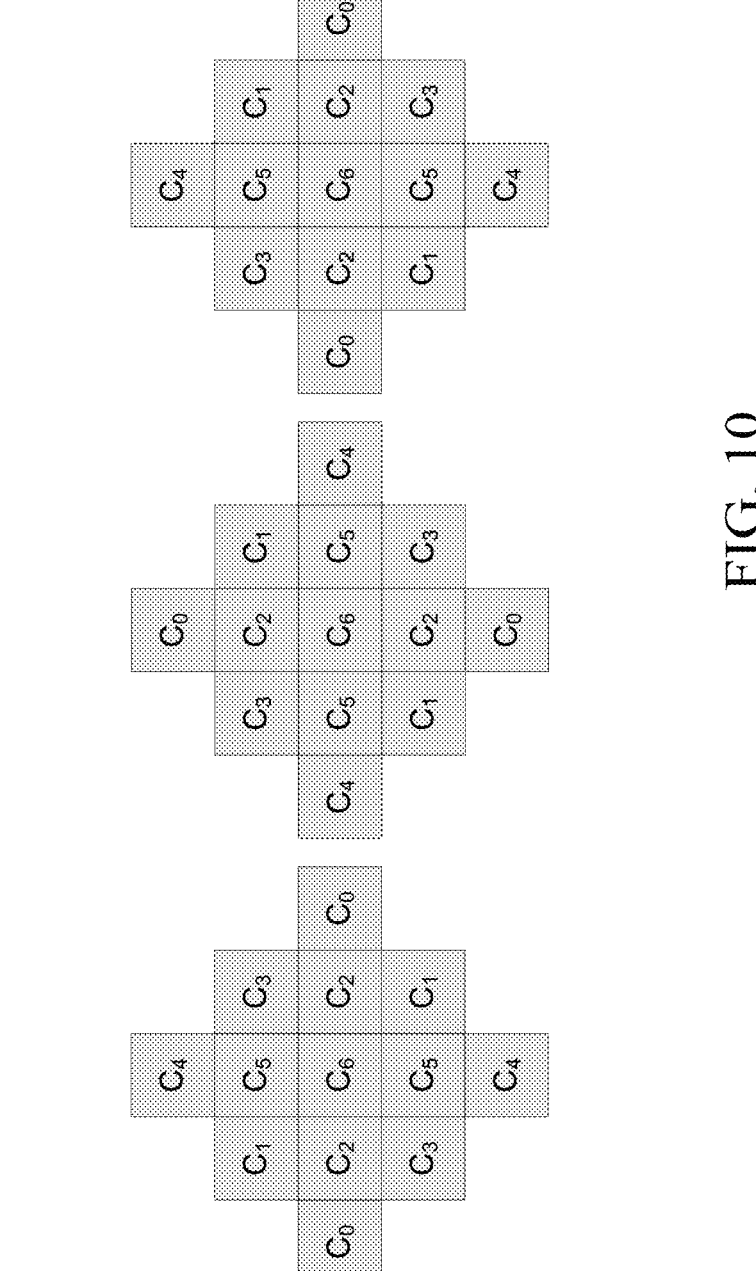

FIG. 10 shows an example of relative coordinates used for the 5×5 diamond filter support.

Figure 11:
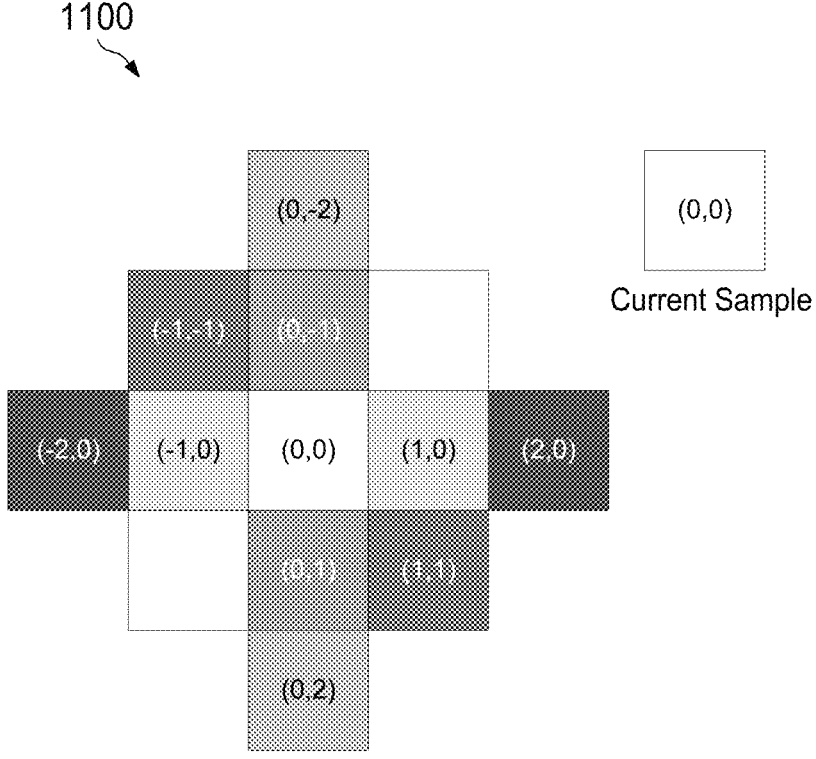

FIG. 11 shows another example of relative coordinates used for the 5×5 diamond filter support.

Figure 12A:
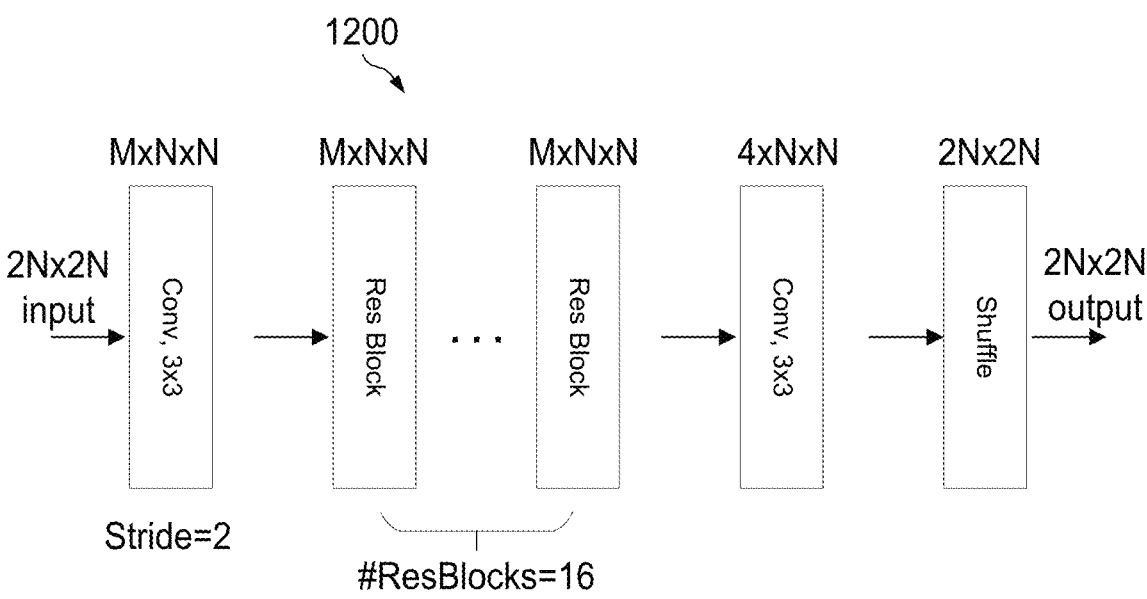

FIG. 12A is an example architecture of the proposed CNN filter.

Figure 12B:
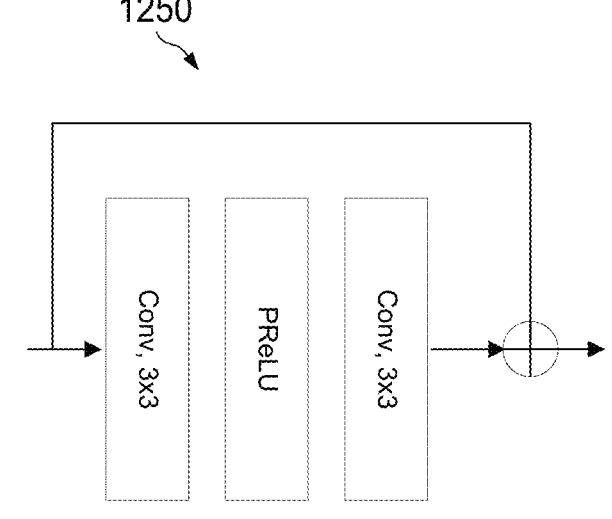

FIG. 12B is an example of construction of residual block (ResBlock).

Figure 13:
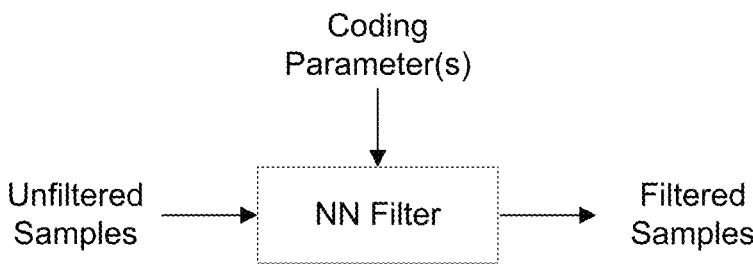

FIG. 13 is an example of a process for generating filtered samples based on a neural network filter model that receives a coding parameter as an input in accordance with various examples.

Figure 14:
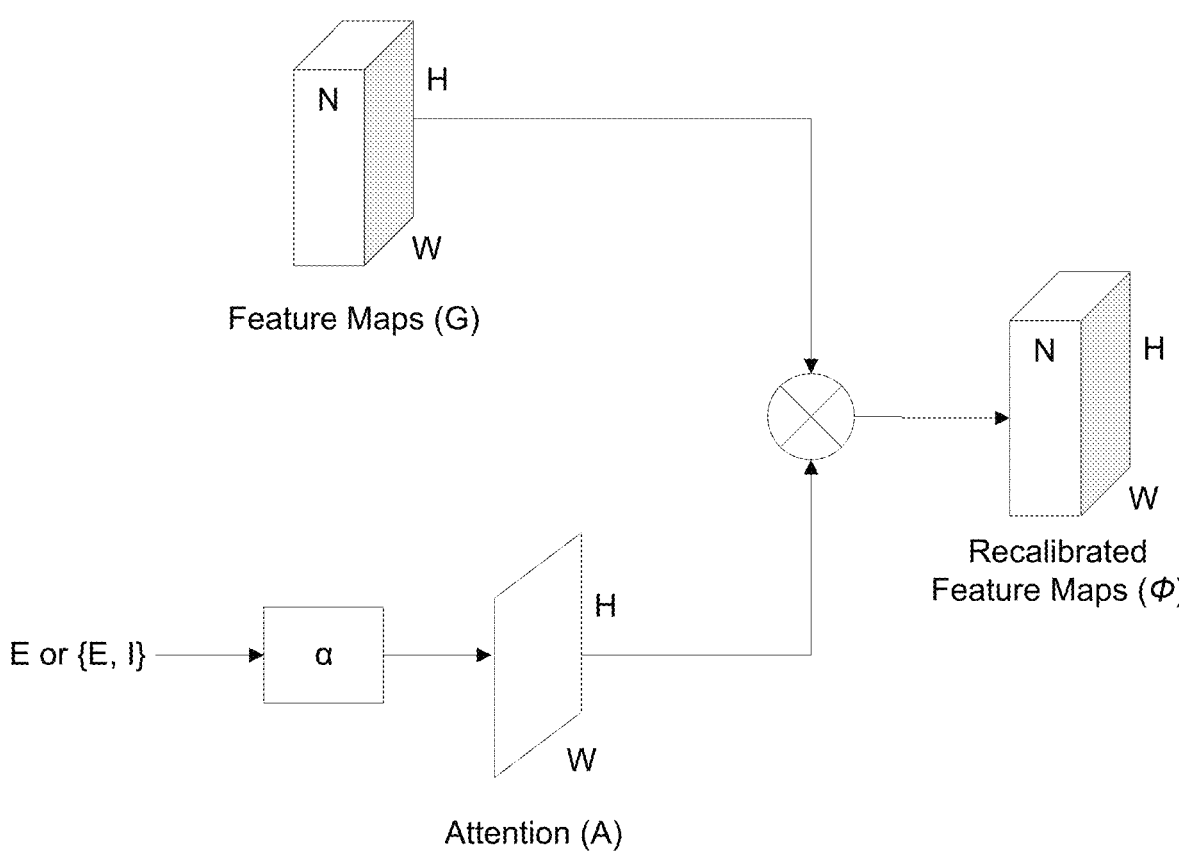

FIG. 14 is an example of applying an attention obtained using external information, such as a coding parameter, on feature maps of a neural network filter model to provide recalibrated feature maps in accordance with various examples.

Figure 15:
Figure 15:
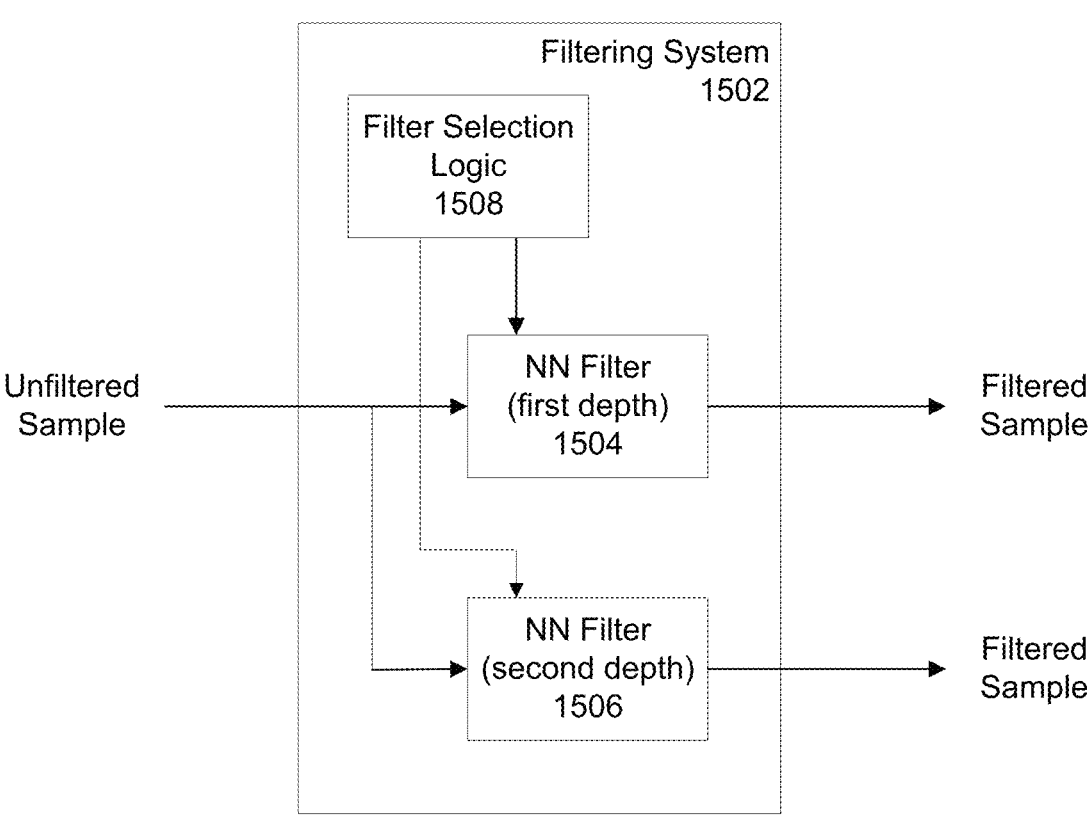

FIG. 15 is an example of a process for applying a neural network filter having a configurable depth to an unfiltered sample of a video unit to generate a filtered sample.

Figure 16A:
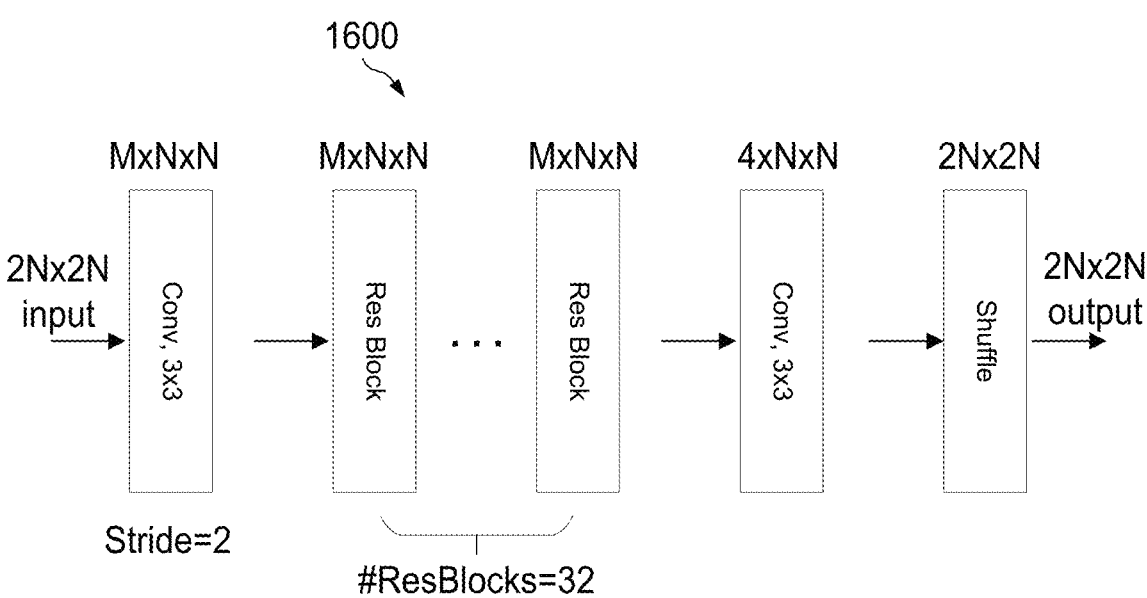
Figure 16B:
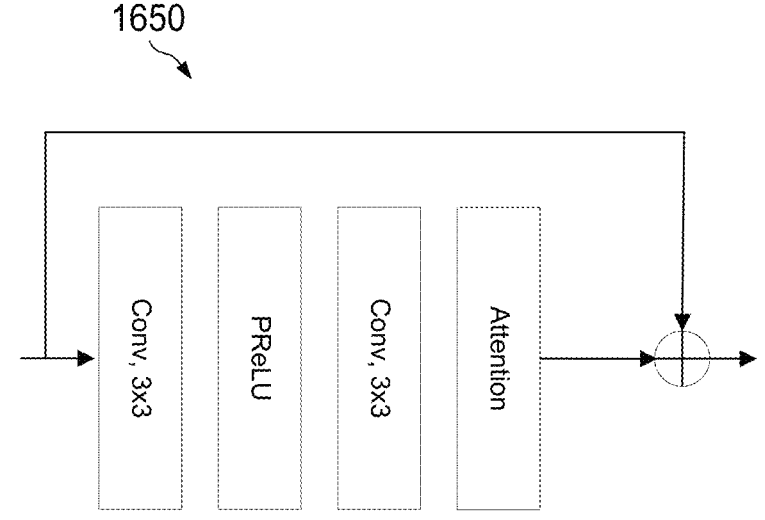

FIG. 16A is a schematic block diagram of architecture of a neural network filtering method in accordance with various examples, and FIG. 16B is a schematic block diagram of an attention residual block used in the architecture of FIG. 16A in accordance with various examples.

Figure 17:
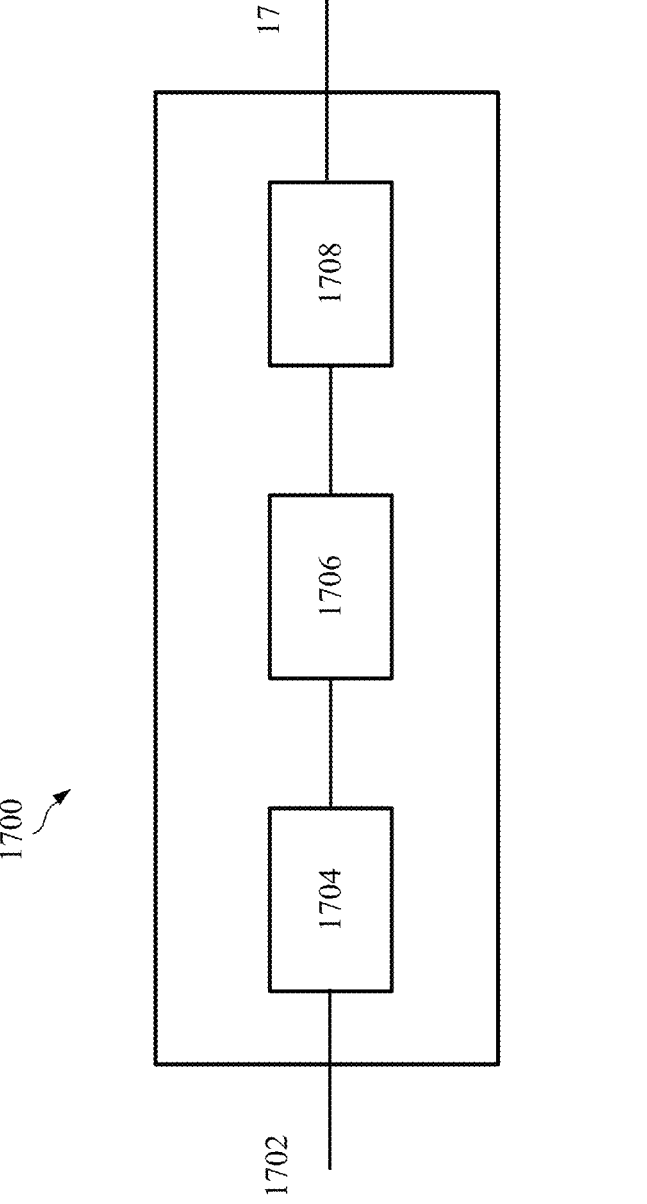

FIG. 17 is a block diagram showing an example video processing system.

Figure 18:
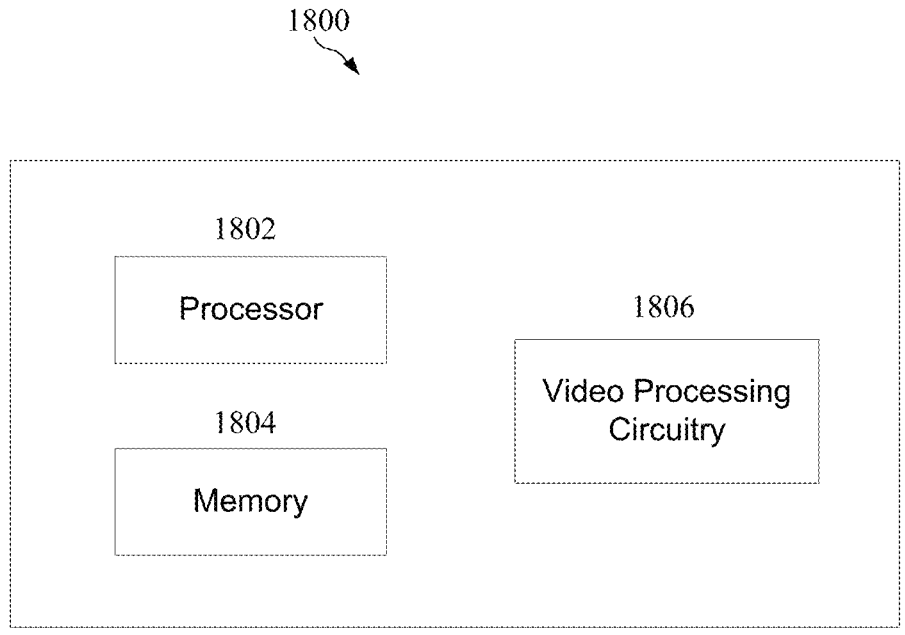

FIG. 18 is a block diagram of a video processing apparatus.

Figure 19:
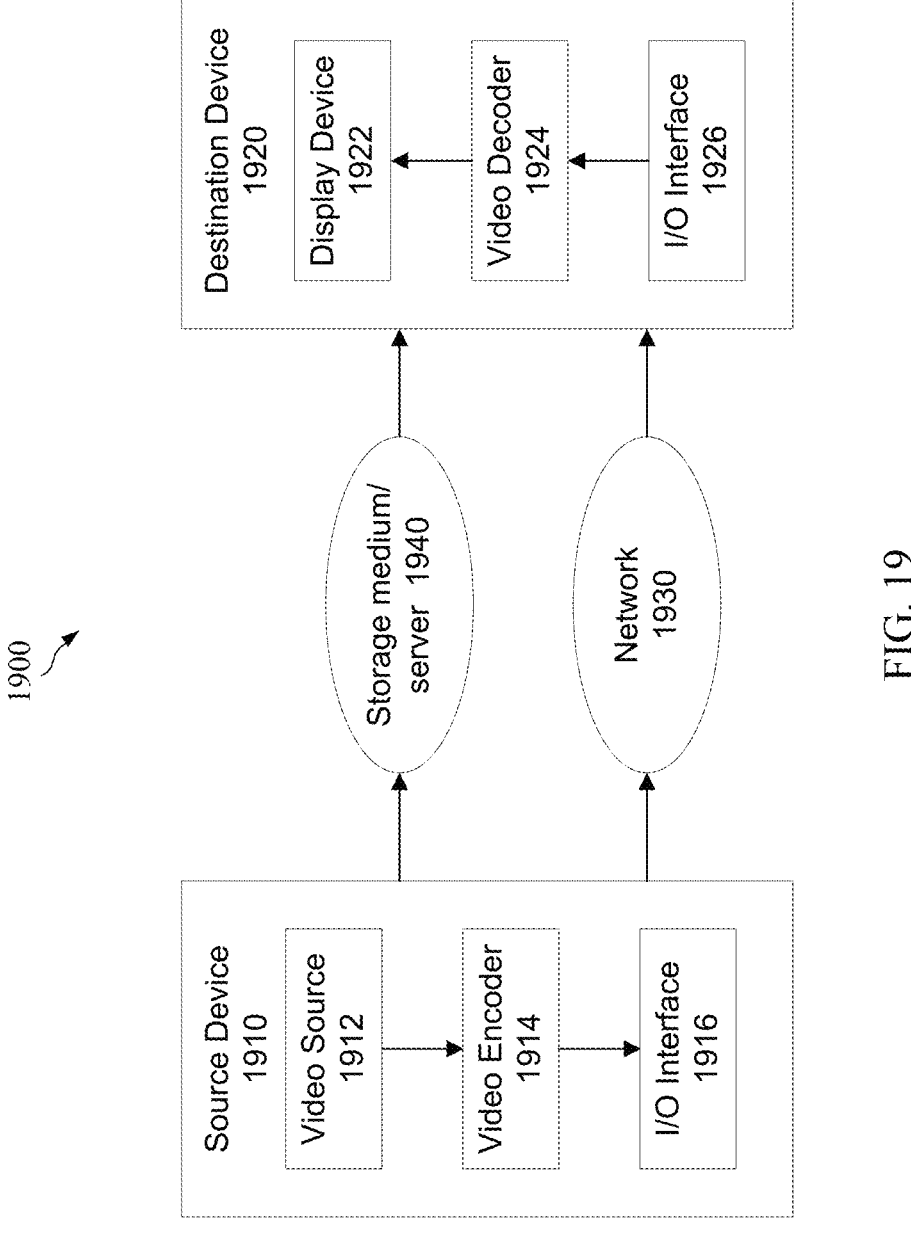

FIG. 19 is a block diagram that illustrates an example video coding system.

Figure 20:
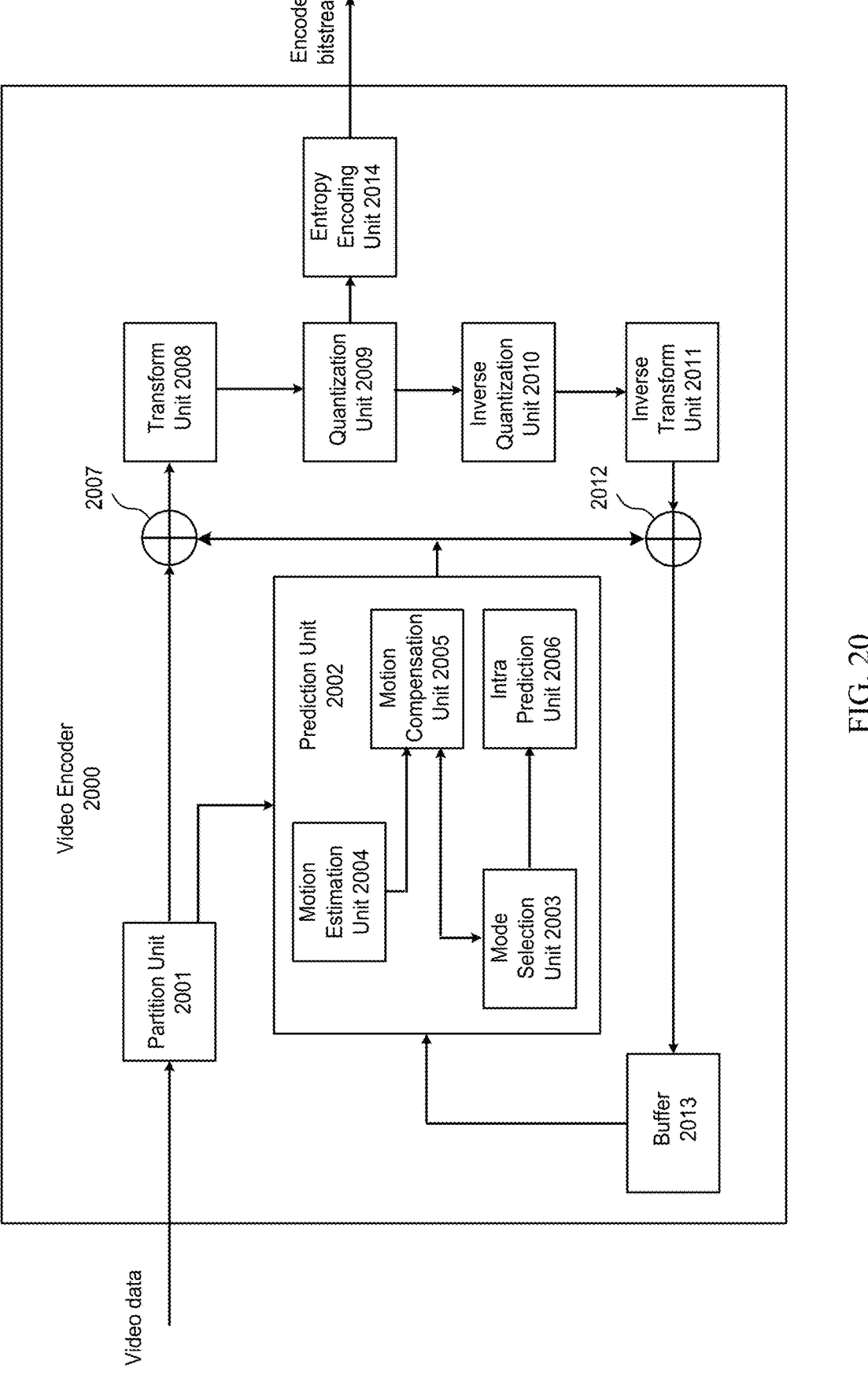

FIG. 20 is a block diagram illustrating an example of video encoder.

Figure 21:
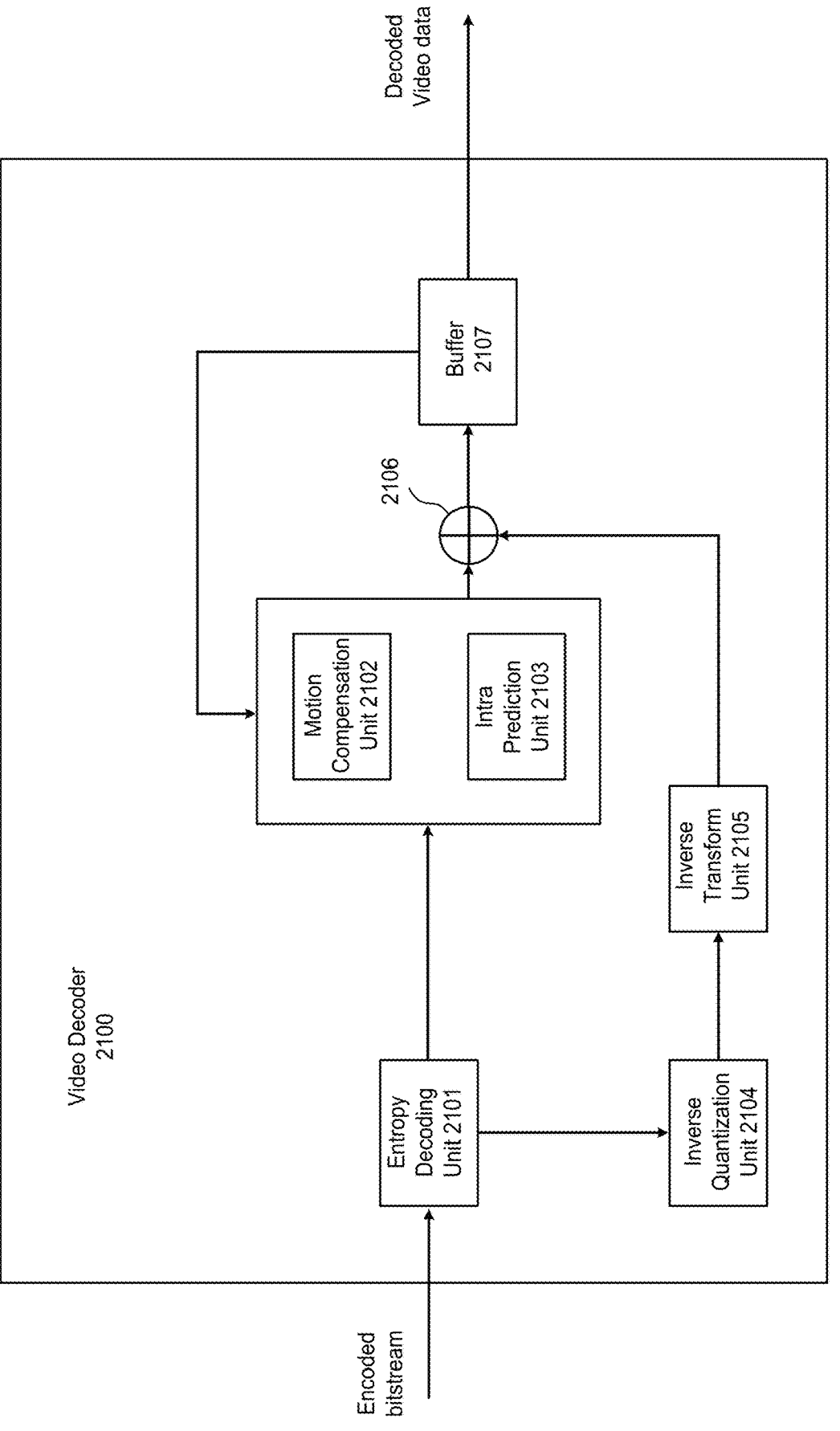

FIG. 21 is a block diagram illustrating an example of video decoder.

FIG. 22 is a method for coding video data according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also.

This description is related to video coding. Specifically, this description is related to a loop filter in image/video coding. The disclosed examples may be applied individually or in various combinations, for video bitstreams coded using existing video coding standards, such as the VVC standard, the High-Efficiency Video Coding (HEVC) standard, or the standards to be finalized (e.g., third-generation Audio Video Coding Standard (AVS3)). The disclosed examples may also be applicable to future video coding standards, future video codecs, or as a post-processing method outside of an encoding/decoding process.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the VVC standard targeting at fifty percent (50%) bitrate reduction compared to HEVC. VVC version 1 was finalized in July 2020.

Color space and chroma subsampling are discussed. Color space, also known as the color model (or color system), is an abstract mathematical model which simply describes the range of colors as tuples of numbers, typically as 3 or 4 values or color components (e.g., red green blue (RGB)). Basically speaking, color space is an elaboration of the coordinate system and sub-space.

For video compression, the most frequently used color spaces are YCbCr and RGB. YCbCr, Y'CbCr, or Y Pb/Cb Pr/Cr, also written as $YC_BC_R$ or $Y'C_BC_R$, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

For 4:4:4 chroma subsampling, each of the three Y'CbCr components have the same sample rate, thus there is no chroma subsampling. This scheme is sometimes used in high-end film scanners and cinematic post production.

For 4:2:2 chroma subsampling, the two chroma components are sampled at half the sample rate of luma: the horizontal chroma resolution is halved. This reduces the bandwidth of an uncompressed video signal by one-third with little to no visual difference.

For 4:2:0 chroma subsampling, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of two both horizontally and vertically. There are three variants of 4:2:0 schemes, having different horizontal and vertical siting.

In MPEG-2, Cb and Cr are co-sited horizontally. Cb and Cr are sited between pixels in the vertical direction (sited interstitially). In Joint Photographic Experts Group (JPEG)/JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

Definitions of video units are provided. A picture is divided into one or more tile rows and one or more tile columns. A tile is a sequence of coding tree units (CTUs) that covers a rectangular region of a picture. A tile is divided into one or more bricks, each of which consists of a number of CTU rows within the tile. A tile that is not partitioned into multiple bricks is also referred to as a brick. However, a brick that is a true subset of a tile is not referred to as a tile. A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 1:
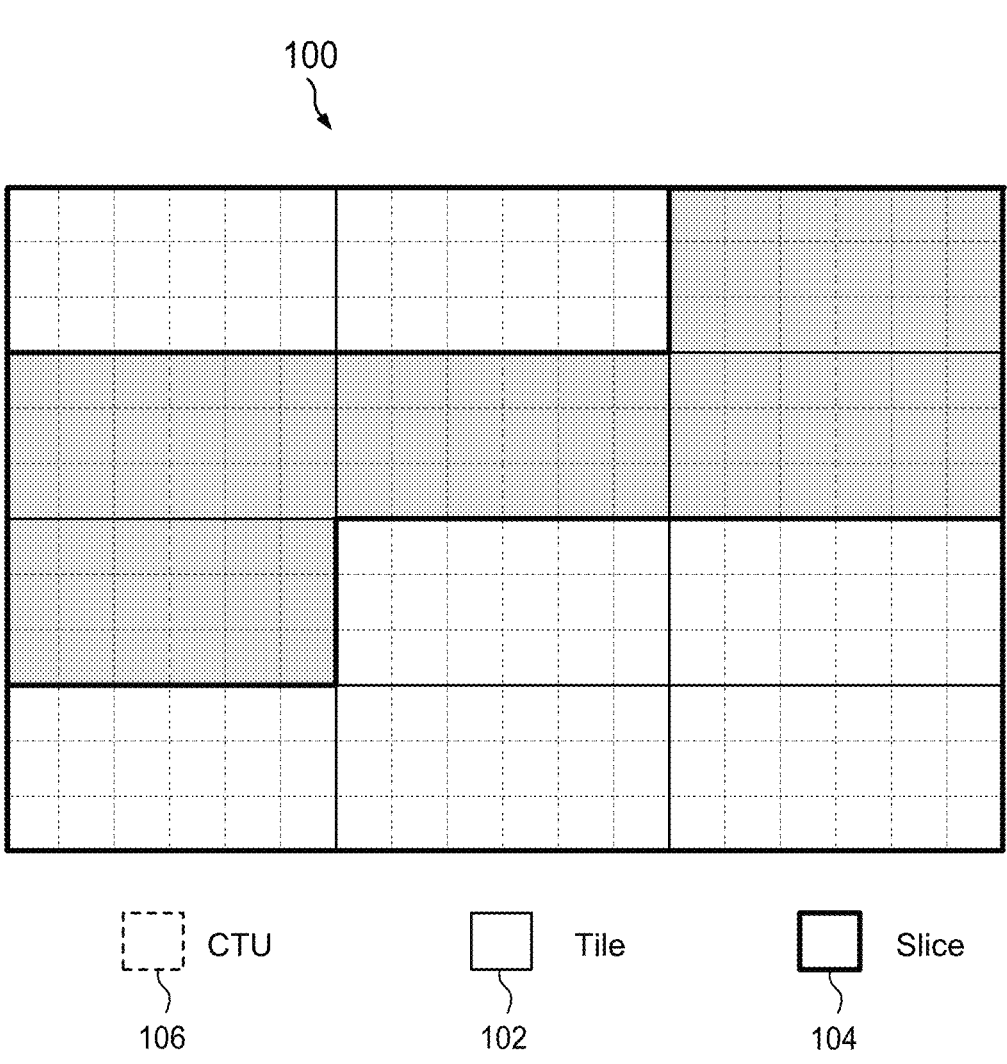
FIG. 1 is an example of raster-scan slice partitioning of a picture.

FIG. 1 is an example of raster-scan slice partitioning of a picture 100, where the picture is divided into twelve tiles 102 and three raster-scan slices 104. As shown, each of the tiles 102 and slices 104 contains a number of CTUs 106.

Figure 2:
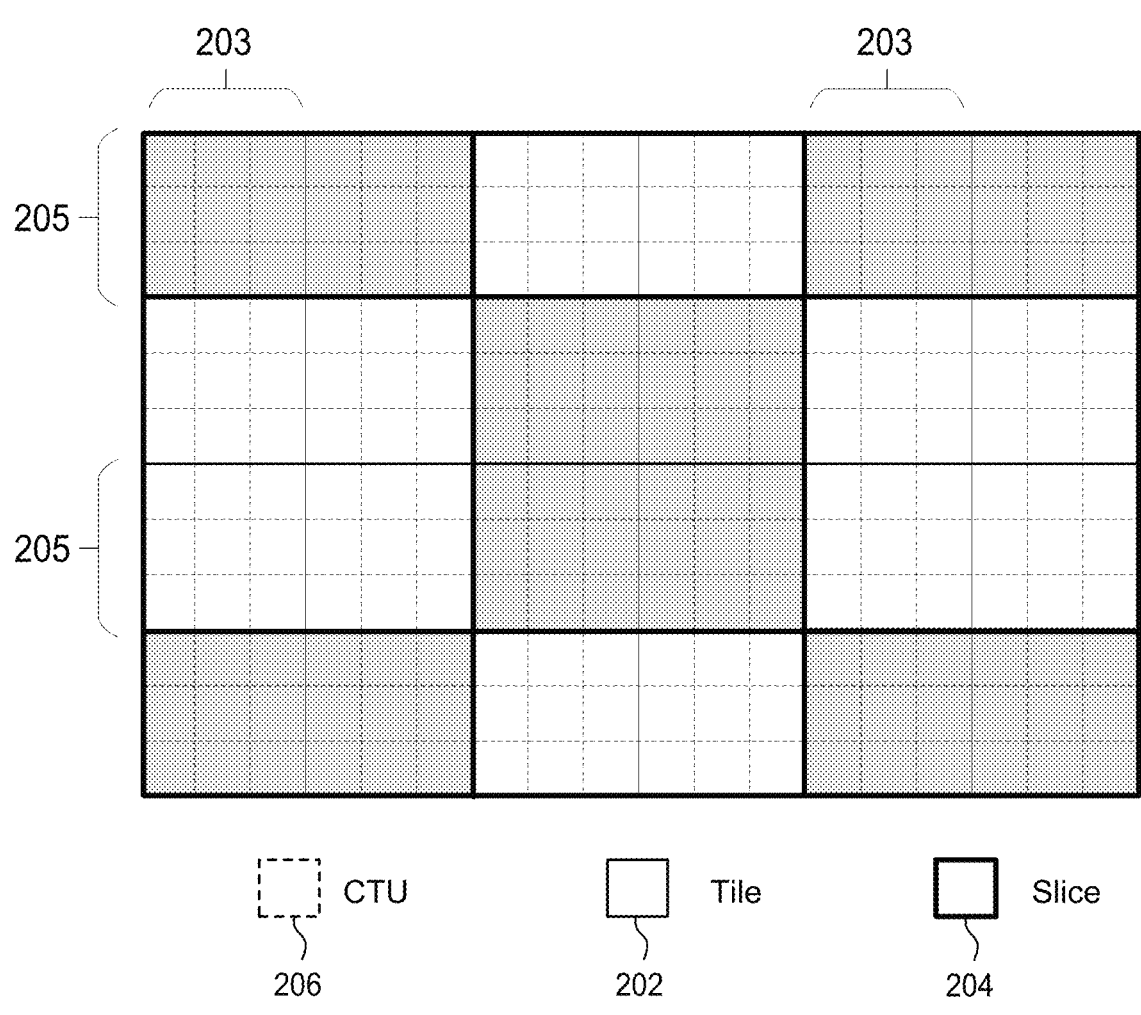
FIG. 2 is an example of rectangular slice partitioning of a picture.

FIG. 2 is an example of rectangular slice partitioning of a picture 200 according to the VVC specification, where the picture is divided into twenty-four tiles 202 (six tile columns 203 and four tile rows 205) and nine rectangular slices 204. As shown, each of the tiles 202 and slices 204 contains a number of CTUs 206.

FIG. 3 is an example of a picture 300 partitioned into tiles, bricks, and rectangular slices according to the VVC specification, where the picture is divided into four tiles 302 (two tile columns 303 and two tile rows 305), eleven bricks 304 (the top-left tile contains one brick, the top-right tile contains five bricks, the bottom-left tile contains two bricks, and the bottom-right tile contain three bricks), and four rectangular slices 306.

CTU and coding tree block (CTB) sizes are discussed. In VVC, the coding tree unit (CTU) size, which is signaled in a sequence parameter set (SPS) by the syntax element log2_ctu_size_minus2, could be as small as 4×4. The sequence parameter set raw byte sequence payload (RBSP) syntax is below.

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gra_enabled_flag | u(1) |
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffering_minus1[ i ] | ue(v) |
|     sps_max_num_reorder_pics[ i ] | ue(v) |
|     sps_max_latency_increase_plus1[ i ] | ue(v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   if( sps_max_mtt_hierarchy_depth_inter_slices != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   ... | |
|   rbsp_trailing_bits( ) | |
| } | | log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinThSizeY, MaxTbSizeY, PicWidthInCtbsY, PicHeightInCtbsY, PicSizeInCtbsY, PicWidthInMinCbsY, PicHeightInMinCbsY, PicSizeIn-MinCbsY, PicSizeInSamiplesY, PicWidthInSamiplesC and PicHeightInSamiplesC are derived as follows.

$$CtbLog2SizeY = log2\_ctu\_size\_minus2 + 2 \qquad (7\text{-}9)$$

$$CtbSizeY = 1 << CtbLog2SizeY \qquad (7\text{-}10)$$

$$MinCbLog2SizeY = log2\_min\_luma\_coding\_block\_size\_minus2 + 2 \qquad (7\text{-}11)$$

$$MinCbSizeY = 1 << MinCbLog2SizeY \qquad (7\text{-}12)$$

$$\text{MinTbLog2Size}Y=2 \quad (7\text{-}13)$$

$$\text{MaxTbLog2Size}Y=6 \quad (7\text{-}14)$$

$$\text{MinThSize}Y=1<<\text{MinTbLog2Size}Y \quad (7\text{-}15)$$

$$\text{MaxTbSize}Y=1<<\text{MaxTbLog2Size}Y \quad (7\text{-}16)$$

$$\text{PicWidthInCtbs}Y=\text{Ceil}$$
$$(\text{pic\_width\_in\_luma\_samples}\div\text{CtbSize}Y) \quad (7\text{-}17)$$

$$\text{PicHeightInCtbs}Y=\text{Ceil}$$
$$(\text{pic\_height\_in\_luma\_samples}\div\text{CtbSize}Y) \quad (7\text{-}18)$$

$$\text{PicSizeInCtbs}Y=\text{PicWidthInCtbs}Y*\text{PicHeightInCtbs}Y \quad (7\text{-}19)$$

$$\text{PicWidthInMinCbs}Y=\text{pic\_width\_in\_luma\_samples}/$$
$$\text{MinCbSize}Y \quad (7\text{-}20)$$

$$\text{PicHeightInMinCbs}Y=\text{pic\_height\_in\_luma\_samples}/$$
$$\text{MinCbSize}Y \quad (7\text{-}21)$$

$$\text{PicSizeInMinCbs}Y=\text{PicWidthInMinCbs}Y*\ \text{PicHeight-}$$
$$\text{InMinCbs}Y \quad (7\text{-}22)$$

$$\text{PicSizeInSamples}Y=\text{pic\_width\_in\_luma\_samples}*$$
$$\text{pic\_height\_in\_luma\_samples} \quad (7\text{-}23)$$

$$\text{PicWidthInSamples}C=\text{pic\_width\_in\_luma\_samples}/$$
$$\text{SubWidth}C \quad (7\text{-}24)$$

$$\text{PicHeightInSamples}C=\text{pic\_height\_in\_luma\_samples}/$$
$$\text{SubHeight}C \quad (7\text{-}25)$$

FIG. 4A is an example of CTBs crossing the bottom picture border. FIG. 4B is an example of CTBs crossing the right picture border. FIG. 4C is an example of CTBs crossing the right bottom picture border. In FIGS. 4A-4C, K=M, L<N; K<M, L=N; K<M, L<N, respectively.

CTUs in a picture 400 are discussed with reference to FIGS. 4A-4C. Suppose the CTB/largest coding unit (LCU) size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs 402 as depicted in FIG. 4A-4C, the CTB size is still equal to M×N, however, the bottom boundary/right boundary of the CTB is outside the picture 400.

The coding flow of a typical video coder/decoder (a.k.a., codec) is discussed. FIG. 5 is an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

FIG. 5 is a schematic diagram of an encoder 500. The encoder 500 is suitable for implementing the techniques of VVC. The encoder 500 includes three in-loop filters, namely a deblocking filter (DF) 502, a sample adaptive offset (SAO) 504, and an ALF 506. Unlike the DF 502, which uses predefined filters, the SAO 504 and the ALF 506 utilize the original samples of the current picture to reduce the mean square errors between the original samples and the reconstructed samples by adding an offset and by applying a FIR filter, respectively, with coded side information signaling the offsets and filter coefficients. The ALF 506 is located at the last processing stage of each picture and can be regarded as a tool trying to catch and fix artifacts created by the previous stages.

The encoder 500 further includes an intra prediction component 508 and a motion estimation/compensation (ME/MC) component 510 configured to receive input video. The intra prediction component 508 is configured to perform intra prediction, while the ME/MC component 510 is configured to utilize reference pictures obtained from a reference picture buffer 512 to perform inter prediction. Residual blocks from inter prediction or intra prediction are fed into a transform component 514 and a quantization component 516 to generate quantized residual transform coefficients, which are fed into an entropy coding component 518. The entropy coding component 518 entropy codes the prediction results and the quantized transform coefficients and transmits the same toward a video decoder (not shown). Quantization components output from the quantization component 516 may be fed into an inverse quantization component 520, an inverse transform component 522, and a reconstruction (REC) component 524. The REC component 524 is able to output images to the DF 502, the SAO 504, and the ALF 506 for filtering prior to those images being stored in the reference picture buffer 512.

The input of the DF 502 is the reconstructed samples before in-loop filters. The vertical edges in a picture are filtered first Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards bottom of the coding blocks in their geometrical order.

FIG. 6 is an illustration 600 of samples 602 within 8×8 blocks of samples 604. As shown, the illustration 600 includes horizontal and vertical block boundaries on an 8×8 grid 606, 608, respectively. In addition, the illustration 600 depicts the nonoverlapping blocks of the 8×8 samples 610, which can be deblocked in parallel.

The boundary decision is discussed. Filtering is applied to 8×8 block boundaries. In addition, it must be a transform block boundary or a coding subblock boundary (e.g., due to usage of Affine motion prediction, Alternative temporal motion vector prediction (ATMVP)). For those which are not such boundaries, the filter is disabled.

The boundary strength calculation is discussed. For a transform block boundary/coding subblock boundary, if it is located in the 8×8 grid, the transform block boundary/coding subblock boundary may be filtered and the setting of $bS[xD_i][yD_j]$ (wherein $[xD_i][yD_j]$ denotes the coordinate) for this edge is defined in Table 1 and Table 2, respectively.

TABLE 1

| Boundary strength (when SPS IBC is disabled) | | | |
|---|---|---|---|
| Priority | Conditions | Y | U | V |
| 5 | At least one of the adjacent blocks is intra | 2 | 2 | 2 |
| 4 | TU boundary and at least one of the adjacent blocks has non-zero transform coefficients | 1 | 1 | 1 |

TABLE 1-continued

| Boundary strength (when SPS IBC is disabled) | | | |
|---|---|---|---|
| Priority | Conditions | Y | U | V |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

| Boundary strength (when SPS IBC is enabled) | | | |
|---|---|---|---|
| Priority | Conditions | Y | U | V |
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

The deblocking decision for a luma component is discussed.

FIG. 7 is an example 700 of pixels involved in filter on/off decision and strong/weak filter selection. A wider-stronger luma filter is used only if all of the Condition 1, Condition 2, and Condition 3 are TRUE. The Condition 1 is the "large block condition." This condition detects whether the samples at P-side and Q-side belong to large blocks, which are represented by the variable bSidePisLargeBlk and bSideQisLargeBlk, respectively. The bSidePisLargeBlk and bSideQisLargeBlk are defined as follows.

bSidePisLargeBlk=((edge type is vertical and $p_0$ belongs to CU with width >=32)||(edge type is horizontal and $p_0$ belongs to CU with height >=32))? TRUE:FALSE bSideQisLargeBlk=((edge type is vertical and $q_0$ belongs to CU with width >=32)||(edge type is horizontal and $q_0$ belongs to CU with height >=32))? TRUE:FALSE Based on bSidePisLargeBlk and bSideQisLargeBlk, the Condition 1 is defined as follows.

Condition 1=(bSidePisLargeBlk bSidePisLargeBlk)? TRUE:FALSE

Next, if Condition 1 is true, the Condition 2 will be further checked. First, the following variables are derived.

dp0, dp3, dq0, dq3 are first derived as in HEVC
if (p side is greater than or equal to 32)

$$dp0=(dp0+\mathrm{Abs}(p5_0-2*p4_0+p3_0)+1)>>1$$

$$dp3=(dp3+\mathrm{Abs}(p5_3-2*p4_3+p3_3)+1)>>1$$

if (q side is greater than or equal to 32)

$$dq0=(dq0+\mathrm{Abs}(q5_0-2*q4_0+q3_0)+1)>>1$$

$$dq3=(dq3+\mathrm{Abs}(q5_3-2*q4_3+q3_3)+1)>>1$$

Condition 2=(d<β)? TRUE:FALSE
where d=dp0+dq0+dp3+dq3.

If Condition 1 and Condition 2 are valid, whether any of the blocks uses sub-blocks is further checked.

```
If (bSidePisLargeBlk)
{
If (mode block P == SUBBLOCKMODE)
    Sp =5
else
    Sp =7
}
else
  Sp = 3
If (bSideQisLargeBlk)
{
If (mode block Q == SUBBLOCKMODE)
    Sq =5
  else
Sq =7
}
else
Sq = 3
```

Finally, if both the Condition 1 and Condition 2 are valid, the proposed deblocking method will check the condition 3 (the large block strong filter condition), which is defined as follows.

In the Condition3 StrongFilterCondition, the following variables are derived.

dpq is derived as in HEVC.
$sp_3=\mathrm{Abs}(p_3-p_0)$, derived as in HEVC
if (p side is greater than or equal to 32)
    if (Sp==5)

$$sp_3=(sp_3+\mathrm{Abs}(p_5-p_3)+1)>>1$$

else $$sp_3=(sp_3+\mathrm{Abs}(p_7-p_3)+1)>>1$$

$sq_3=\mathrm{Abs}(q_0-q_3)$, derived as in HEVC
if (q side is greater than or equal to 32)
    If (Sq=5)

$$sq_3=(sq_3+\mathrm{Abs}(q_5-q_3)+1)>>1$$

else $$sq_3=(sq_3+\mathrm{Abs}(q_7-q_3)+1)>>1$$

As in HEVC, StrongFilterCondition=(dpq is less than (β>>2), $sp_3+sq_3$ is less than (3*β>>5), and Abs($p_0-q_0$) is less than (5*$t_C$+1)>>1)? TRUE:FALSE.

A stronger deblocking filter for luma (designed for larger blocks) is discussed.

Bilinear filter is used when samples at either one side of a boundary belong to a large block. A sample belonging to a large block is defined as when the width >=32 for a vertical edge, and when height >=32 for a horizontal edge.

The bilinear filter is listed below.

Block boundary samples $p_i$ for i=0 to Sp−1 and $q_j$ for j=0 to Sq−1 (pi and qi are the i-th sample within a row for filtering vertical edge, or the i-th sample within a column for filtering horizontal edge) in HEVC deblocking described above) are then replaced by linear interpolation as follows.

$$p_i'=(f_i*\mathrm{Middle}_{s,t}+(64-f_i)*P_s+32)>>6),\text{clipped to } p_i\pm\mathrm{tcPD}_i$$

$$q_j'=(g_j*\mathrm{Middle}_{s,t}+(64-g_j)*Q_s+32)>>6),\text{clipped to } q_j\pm\mathrm{tcPD}_j$$

where $tcPD_i$ and $tcPD_j$ term is a position dependent clipping described in below and $g_j$, $f_i$, $Middle_{s,t}$, $P_s$ and $Q_s$ are given below.

A deblocking control for chroma is discussed.

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition: d is then derived as in HEVC luma deblocking. The second condition will be TRUE when d is less than β.

In the third condition StrongFilterCondition is derived as follows.

dpq is derived as in HEVC
$sp_3=Abs(p_3-p_0)$, derived as in HEVC
$sq_3=Abs(q_0-q_3)$, derived as in HEVC As in HEVC design, StrongFilterCondition=(dpq is less than ($\beta>>2$), $sp_3+sq_3$ is less than ($\beta>>3$), and $Abs(p_0-q_0)$ is less than ($5*t_C+1)>>1$).

A strong deblocking filter for chroma is discussed. The following strong deblocking filter for chroma is defined.

$$p_2'=(3*p_3+2*p_2+p_1+p_0+q_0+4)>>3$$

$$p_1'=(2*p_3+p_2+2*p_1+p_0+q_0+q_1+4)>>3$$

$$p_0'=(p_3+p_2+p_1+2*p_0+q_0+q_1+q_2+4)>>3$$

The proposed chroma filter performs deblocking on a 4×4 chroma sample grid.

Position dependent clipping (tcPD) is discussed. The position dependent clipping tcPD is applied to the output samples of the luma filtering process involving strong and long filters that are modifying 7, 5, and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in the boundary strength calculation, position dependent threshold table is selected from two tables (i.e., Tc7 and Tc3 tabulated below) that are provided to decoder as a side information.

$$Tc7=\{6,5,4,3,2,1,1\}; Tc3=\{6,4,2\};$$

$$tcPD=(Sp==3)?Tc3: Tc7;$$

$$tcQD=(Sq==3)?Tc3: Tc7;$$

For the P or Q boundaries being filtered with a short symmetrical filter, position dependent threshold of lower magnitude is applied.

$$Tc3=\{3,2,1\};$$

Following defining the threshold, filtered $p'_i$ and $q'_i$ sample values are clipped according to tcP and tcQ clipping values.

$$p''_i=Clip3(p'_i+tcP_i, p'_i-tcP_i, p'_i);$$

$$q''_j=Clip3(q'_j+tcQ_j, q'_j-tcQ_j, q'_j)$$

where $p'_i$ and $q'_i$ are filtered sample values, $p''_i$ and $q''_i$ are output sample value after the clipping, and $tcP_i$ $tcP_i$ are clipping thresholds that are derived from the VVC tc parameter and tcPD and tcQD. The function Clip3 is a clipping function as it is specified in VVC.

Sub-block deblocking adjustment is now discussed. To enable parallel friendly deblocking using both long filters and sub-block deblocking the long filters is restricted to modify at most 5 samples on a side that uses sub-block deblocking (AFFINE or ATMVP or decoder side motion vector refinement (DMVR)) as shown in the luma control for long filters. Additionally, the sub-block deblocking is adjusted such that that sub-block boundaries on an 8×8 grid that are close to a coding unit (CU) or an implicit TU boundary is restricted to modify at most two samples on each side.

The following applies to sub-block boundaries that not are aligned with the CU boundary.

```
If (mode block Q == SUBBLOCKMODE && edge !=0) {
  if (!(implicitTU && (edge == (64 / 4)))
    if (edge == 2 || edge == (orthogonalLength – 2) || edge == (56 / 4) ||
    edge == (72 / 4))
      Sp = Sq = 2;
    else
      Sp = Sq = 3;
  else
    Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary, etc. Where implicit TU is true if implicit split of TU is used.

Sample adaptive offset (SAO) is discussed. The input of SAO is the reconstructed samples after deblocking (DB). The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

FIG. 8 shows four one dimensional (1-D) directional patterns 800 for EO sample classification: horizontal (EO class=0), vertical (EO class=1), 135° diagonal (EO class=2), and 45° diagonal (EO class=3).

For a given EO class, each sample inside the CTB is classified into one of five categories. The current sample value, labeled as "c," is compared with its two neighbors along the selected 1-D pattern. The classification rules for each sample are summarized in Table 3. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c < a and c < b |
| 2 | (c < a && c == b) \|\|(c == a && c < b) |
| 3 | (c > a && c == b) \|\|(c == a && c > b) |
| 4 | c > a && c > b |
| 5 | None of above |

Geometry transformation-based adaptive loop filter in Joint Exploration Model (JEM) is discussed. The input of DB is the reconstructed samples after DB and SAO. The sample classification and filtering process are based on the reconstructed samples after DB and SAO.

In the JEM, a geometry transformation-based adaptive loop filter (GALF) with block-based filter adaption is applied. For the luma component, one among twenty-five filters is selected for each 2×2 block, based on the direction and activity of local gradients.

The filter shape is discussed. FIG. 9 shows examples of GALF filter shapes 900, including on the left a 5×5 diamond, in the middle a 7×7 diamond, and one the right a 9×9 diamond. In the JEM, up to three diamond filter shapes (as shown in FIG. 9) can be selected for the luma component. An index is signaled at the picture level to indicate the filter shape used for the luma component. Each square represents a sample, and Ci (i being 0~6 (left), 0~12 (middle), 0~20 (right)) denotes the coefficient to be applied to the sample. For chroma components in a picture, the 5×5 diamond shape is always used.

Block classification is discussed. Each 2×2 block is categorized into one out of twenty-five classes. The classification index C is derived based on its directionality D and a quantized value of activity $\hat{A}$, as follows.

$$C = 5D + \hat{A}. \tag{1}$$

To calculate D and $\hat{A}$, gradients of the horizontal, vertical and two diagonal direction are first calculated using 1-D Laplacian.

$$g_v = \sum_{k=i-2}^{i+3} \sum_{l=j-2}^{j+3} V_{k,l}, \quad V_{k,l} = |2R(k, l) - R(k, l-1) - R(k, l+1)|, \tag{2}$$

$$g_h = \sum_{k=i-2}^{i+3} \sum_{l=j-2}^{j+3} H_{k,l}, \quad H_{k,l} = |2R(k, l) - R(-1, l) - R(k+1, l)|, \tag{3}$$

$$g_{d1} = \sum_{k=i-2}^{i+3} \sum_{l=j-3}^{j+3} D1_{k,l}, \quad D1_{k,l} = |2R(k, l) - R(k-1, l-1) - R(k+1, l+1)| \tag{4}$$

$$g_{d2} = \sum_{k=i-2}^{i+3} \sum_{j=j-2}^{j+3} D2_{k,l}, \quad D2_{k,l} = |2R(k, l) - R(k-1, l+1) - R(k+1, l-1)| \tag{5}$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), \; g_{h,v}^{min} = \min(g_h, g_v), \tag{6}$$

and the maximum and minimum values of the gradient of two diagonal directions are set as:

$$g_{d0,d1}^{max} = \max(g_{d0}, g_{d1}), \; g_{d0,d1}^{min} = \min(g_{d0}, g_{d1}), \tag{7}$$

To derive the value of the directionality D, these values are compared against each other and with two thresholds $t_1$ and $t_2$:

Step 1. If both $$g_{h,v}^{max} \leq t_1 \cdot g_{h,v}^{min}$$

and $$g_{d0,d1}^{max} \leq t_1 \cdot g_{d0,d1}^{min}$$

are true, D is set to 0.

Step 2. If $$g_{h,v}^{max}/g_{h,v}^{min} > g_{d0,d1}^{max}/g_{d0,d1}^{min},$$

continue from Step 3; otherwise continue from Step 4.

Step 3. If $$g_{h,v}^{max} > t_2 \cdot g_{h,v}^{min},$$

D is set to 2; otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A = \sum_{k=i-2}^{i+3} \sum_{l=j-2}^{j+3} (V_{k,l} + H_{k,l}). \tag{8}$$

A is further quantized to the range of 0 to 4, inclusively, and the quantized value is denoted as $\hat{A}$.

For both chroma components in a picture, no classification method is applied, i.e. a single set of ALF coefficients is applied for each chroma component.

Geometric transformation of filter coefficients is discussed.

FIG. 10 shows relative coordinates 1000 for the 5×5 diamond filter support-diagonal, vertical flip, and rotation, respectively (from left to right).

Before filtering each 2×2 block, geometric transformations such as rotation or diagonal and vertical flipping are applied to the filter coefficients f(k,l), which is associated with the coordinate (k, l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip, and rotation are introduced:

Diagonal: $f_D(k,l)=f(l,k)$,

Vertical flip: $f_V(k,l)=f(k,K-l-1)$,

Rotation: $f_R(k,l)=f(K-l-1,k)$. (9)

where K is the size of the filter and $0 \leq k$, $l \leq K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 4.

TABLE 4

| Mapping of the gradient calculated for one block and the transformations | |
|---|---|
| Gradient values | Transformation |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter parameters signaling is discussed. In the JEM, GALF filter parameters are signalled for the first CTU, i.e., after the slice header and before the SAO parameters of the first CTU. Up to 25 sets of luma filter coefficients could be signalled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signalling. In this case, only an index to one of the reference pictures is signalled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture does not use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and the k-th array only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signalling overhead. For intra frames, temporal prediction is not available, and a set of 16 fixed filters is assigned to each class. To indicate the usage of the fixed filter, a flag for each class is signalled and if required, the index of the chosen fixed filter. Even when the fixed filter is selected for a given class, the coefficients of the adaptive filter f(k, l) can still be sent for this class in which case the coefficients of the filter which will be applied to the reconstructed image are sum of both sets of coefficients.

The filtering process of luma component can be controlled at the CU level. A flag is signalled to indicate whether GALF is applied to the luma component of a CU. For chroma component, whether GALF is applied or not is indicated at picture level only.

The filtering process is discussed. At the decoder side, when GALF is enabled for a block, each sample R(i,j) within the block is filtered, resulting in sample value R'(i,j) as shown below, where L denotes filter length, $f_{m,n}$ represents filter coefficient, and f(k, l) denotes the decoded filter coefficients.

$$R'(i, j) = \sum_{k=-L/2}^{L/2}\sum_{l=-L/2}^{L/2} f(k, l) \times R(i + k, j + l) \tag{10}$$

FIG. 11 shows an example of relative coordinates used for 5×5 diamond filter support supposing the current sample's coordinate (i, j) to be (0, 0). Samples in different coordinates filled with the same color are multiplied with the same filter coefficients.

Geometry transformation-based adaptive loop filter (GALF) in VVC is discussed. In VVC test model 4.0 (VTM4.0), the filtering process of the Adaptive Loop Filter, is performed as follows:

$$O(x,y)=\Sigma_{(i,j)}w(i,j)\cdot I(x+i,y+j), \tag{11}$$

where samples I(x+i, y+j) are input samples, O(x, y) is the filtered output sample (i.e., filter result), and w(i,j) denotes the filter coefficients. In practice, in VTM4.0 it is implemented using integer arithmetic for fixed point precision computations $$O(x, y) = \left( \sum_{i=-\frac{L}{2}}^{\frac{L}{2}} \sum_{j=-\frac{L}{2}}^{\frac{L}{2}} w(i, j).I(x + i, y + j) + 64 \right) \gg 7, \tag{12}$$

where L denotes the filter length, and where w(i,j) are the filter coefficients in fixed point precision.

The current design of GALF in VVC has the following major changes compared to that in JEM:

1) The adaptive filter shape is removed. Only 7×7 filter shape is allowed for luma component and 5×5 filter shape is allowed for chroma component.
2) Signaling of ALF parameters in removed from slice/picture level to CTU level.
3) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

Non-linear ALF in the current VVC is discussed with regard to filtering reformulation.

Equation (11) can be reformulated, without coding efficiency impact, in the following expression:

$$O(x,y)=I(x,y)+\Sigma_{(i,j)\neq(0,0)}w(i,j)\cdot(I(x+i,y+j)-I(x,y)), \quad (13)$$

where w(i,j) are the same filter coefficients as in equation (11) [excepted w(0, 0) which is equal to 1 in equation (13) while it is equal to $1-\Sigma_{(i,j)\neq(0,0)}w(i,j)$ in equation (11)].

Using the above filter formula of (13), VVC introduces the non-linearity to make ALF more efficient by using a simple clipping function to reduce the impact of neighbor sample values (I(x+i, y+j)) when they are too different with the current sample value (I(x, y)) being filtered.

More specifically, the ALF filter is modified as follows:

$$O'(x,y)=I(x,y)+\Sigma_{(i,j)\neq(0,0)}w(i,j)\cdot K(I(x+i,y+j)-I(x,y),k(i,j)), \quad (14)$$

where K(d,b)=min(b, max(−b,d)) is the clipping function, and k(i,j) are clipping parameters, which depends on the (i,j) filter coefficient. The encoder performs the optimization to find the best k(i,j).

In the JVET-N0242 implementation, the clipping parameters k(i,j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values used in the JVET-N0242 tests are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{\text{round}\left(\left((M)^{\frac{1}{N}}\right)^{N-n+1}\right) \text{ for } n \in 1... \ N\right\}, \quad (15)$$

with $M = 2^{10}$ and $N = 4$.

Similarly, the Chroma tables of clipping values is obtained according to the following formula:

$$AlfClip_C = \left\{\text{round}\left(A\left(\left(\frac{M}{A}\right)^{\frac{1}{N-1}}\right)^{N-n}\right) \text{ for } n \in 1... \ N\right\}, \quad (16)$$

with $M = 2^{10}$, $N = 4$ and $A = 4$.

20

TABLE 5

Authorized clipping values

| | INTRA/INTER tile group |
|---|---|
| LUMA | {1024, 181, 32, 6} |
| CHROMA | {1024, 161, 25, 4} |

The selected clipping values are coded in the "alf_data" syntax element by using a Golomb encoding scheme corresponding to the index of the clipping value in the above Table 5. This encoding scheme is the same as the encoding scheme for the filter index.

Convolutional Neural network-based loop filters for video coding are discussed.

In deep learning, a convolutional neural network (CNN, or ConvNet) is a class of deep neural networks, most commonly applied to analyzing visual imagery. They have very successful applications in image and video recognition/processing, recommender systems, image classification, medical image analysis, natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

Deep learning-based image/video compression typically has two implications: end-to-end compression purely based on neural networks, and traditional frameworks enhanced by neural networks. End-to-end compression purely based on neural networks are discussed in Johannes Ballé, Valero Laparra, and Eero P. Simoncelli, "End-to-end optimization of nonlinear transform codes for perceptual quality," In: 2016 Picture Coding Symposium (PCS), pp. 1-5, Institute of Electrical and Electronics Engineers (IEEE) and Lucas Theis, Wenzhe Shi, Andrew Cunningham, and Ferenc Huszár, "Lossy image compression with compressive auto-encoders," arXiv preprint arXiv:1703.00395 (2017). Traditional frameworks enhanced by neural networks are discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), 3236-3247, Yuanying Dai, Dong Liu, and Feng Wu, "A convolutional neural network approach for post-processing in HEVC intra coding," MMM. Springer, 28-39, Rui Song, Dong Liu, Houqiang Li, and Feng Wu, "Neural network-based arithmetic coding of intra prediction modes in HEVC," VCIP. IEEE, 1-4, and J. Pfaff P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213.

The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, a fully connected network for the intra prediction is proposed in HEVC as discussed in Jiahao Li, Bin Li, Jizheng Xu, Ruiqin Xiong, and Wen Gao, "Fully Connected Network-Based Intra Prediction for Image Coding," IEEE Transactions on Image Processing 27, 7 (2018), p. 3236-3247.

In addition to intra prediction, deep learning is also exploited to enhance other modules. For example, the in-loop filters of HEVC are replaced with a convolutional neural network and achieve promising results in Yuanying Dai, Dong Liu, and Feng Wu, "A convolutional neural network approach for post-processing in HEVC intra coding," MMM. Springer, 28-39. The work in Rui Song, Dong Liu, Houqiang Li, and Feng Wu, "Neural network-based arithmetic coding of intra prediction modes in HEVC," VCIP. IEEE, 1-4 applies neural networks to improve the arithmetic coding engine.

Convolutional neural network based in-loop filtering is discussed. In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

Training is discussed. The purpose of the training processing is to find the optimal value of parameters including weights and bias.

First, a codec (e.g. HM, JEM, VTM, etc.) is used to compress the training dataset to generate the distorted reconstruction frames. Then, the reconstructed frames are fed into the CNN and the cost is calculated using the output of CNN and the groundtruth frames (original frames). Commonly used cost functions include Sum of Absolution Difference (SAD) and Mean Square Error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

The convolutional process is discussed. During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

FIG. 12A is an example architecture 1200 of the proposed CNN filter, and FIG. 12B is an example of construction 1250 of residual block (ResBlock). In most of deep convolutional neural networks, residual blocks are utilized as the basic module and stacked several times to construct the final network wherein in one example, the residual block is obtained by combining a convolutional layer, a ReLU/PReLU activation function and a convolutional layer as shown in FIG. 12B.

Inference is discussed. During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

The current CNN-based loop filtering has certain problems. For example, a NN model does not use or otherwise leverage external information (e.g., including information from a video codec, such as coding parameters and/or coding syntax, which is information external to that generated by the NN model itself) as attention, or as an attention mechanism. Accordingly, information including various coding parameters such as prediction (e.g., prediction mode, motion vectors, and the like), split (e.g., partitioning information), and the like may not be fully exploited, such as to recalibrate feature maps. Additionally, conventional NN models may have a fixed depth (e.g., a number of residual blocks in the NN model, such as those shown above in FIGS. 12A and 12B), which may result in over-processing or under-processing a video unit depending on various characteristics of the video unit. Over-processing a video unit, such as by applying an NN model with more residual blocks than are needed, may be inefficient. Under-processing a video unit, such as by applying an NN model with too few residual blocks, may result in reduced video coding performance.

Disclosed herein are techniques that solve one or more of the foregoing problems. For example, the present disclosure provides one or more neural network (NN) filter models trained as coding tools to improve the efficiency of video coding. The NN-based coding tools can be used to replace or otherwise enhance the modules involved in a video codec. For example, a NN model can serve as an additional intra prediction mode, inter prediction mode, transform kernel, or loop filter. The present disclosure also elaborates on how to use multiple NN models, with at least some of the NN models having a different depth (e.g., a number of residual blocks) than others of the NN models. The selection of a particular NN model may be in a predefined manner, or derived in an on-the-fly manner, which are described further below. It should be noted that the NN models could be used as any coding tools, such as NN-based intra/inter prediction, NN-based super-resolution, NN-based motion compensation, NN-based reference generation, NN-based fractional pixel interpolation, NN-based in-loop/post filtering, and the like.

The listing of embodiments below should be considered as examples to explain general concepts. These embodiments should not be interpreted in a narrow way. Furthermore, these embodiments can be combined in any manner.

In the disclosure, a NN model can include any kind of NN architecture, such as a convolutional neural network (CNN) or a fully connected NN, or a combination of CNNs and fully connected NNs. In the following discussion, an NN model may also be referred to as a CNN model.

In the following discussion, a video unit may be a sequence, a picture, a slice, a tile, a brick, a subpicture, a CTU/CTB, a CTU/CTB row, one or multiple CUs/coding blocks (CBs), one or multiple CTUs/CTBs, one or multiple Virtual Pipeline Data Unit (VPDU), a sub-region within a picture/slice/tile/brick. A father video unit represents a unit larger than the video unit. Typically, a father unit will contain several video units, for example, when the video unit is CTU, the father unit could be slice, CTU row, multiple CTUs, etc. In some embodiments, the video unit may be a sample/pixel.

FIG. 13 is an example of a process 1300 for generating filtered samples based on a NN filter model that receives a coding parameter (e.g., external information to the NN filter model) as an input. The NN filter model has an attention mechanism that is based on the coding parameter input. The attention mechanism is configured to generate or obtain an attention, which is useful to mimic cognitive attention and, in effect, enhances some parts of data input to the NN filter while diminishing other parts of data input to the NN filter. For example, an attention may be obtained by processing external information to the NN filter model, such as one or more coding parameters, to extract the attention. The attention is configured to be applied to one or more feature maps, such as by weighting the feature maps according to the attention.

In the process 1300 shown in FIG. 13, at least some unfiltered samples are provided as input into an NN filter. In an example, an unfiltered sample is a sample (e.g., a pixel) of a video unit that has not been subjected to any filtering yet, or has not been subjected to a sufficient amount of filtering yet. The output of the NN filter may thus be a filtered sample. The output of the NN filter is also based on an NN filter model generated using a coding parameter input. The coding parameter input may be related to a reconstruction of the video unit, a split or partitioning scheme for the video unit, a prediction mode of the video unit, a quantization parameter (QP) associated with the video unit, and/or a boundary strength parameter for a boundary of the video unit.

For example, convolutional layers may be used to extract features from the coding parameters (e.g., external information), or from both the coding parameters and internal information, such as features extracted inside the NN filter model. At least one of the extracted features is used as an obtained attention in the NN filter model.

FIG. 14 is an example of a process 1400 applying an attention obtained using external information, such as a coding parameter, on feature maps of a NN filter model to provide recalibrated feature maps in accordance with some examples. The feature maps of a NN filter model are the result of applying the filters to an input image (or a feature map that is provided as output by a prior layer). For example, at each layer of the NN filter model, the feature map is the output of that layer. Accordingly, feature maps produced by layers internal to the NN filter model may be referred to as intermediate feature maps, while a feature map produced by a final layer of the NN filter model may be referred to as a final feature map. For example, a final output of the NN filter model may be the final feature map.

In the example of FIG. 14, an operation performed by the convolutional layer(s) of the NN filter model is denoted as α, while external information (e.g., coding parameters) are denoted as E, and internal information (e.g., feature maps extracted inside the NN filter model) are denoted as I. The obtained attention is denoted as A. The process 1400 applies the attention A on feature maps G to generate recalibrated feature maps φ.

Accordingly, the operation α is applied to the external information (e.g., coding parameters), or a concatenation of the external information and internal information, to extract or otherwise obtain the attention A. The attention A is applied to feature maps G to generate recalibrated feature maps φ. For example, applying the attention A to the feature maps G effectively reweights the feature maps G (e.g., applies different weights to different elements of the feature maps G), and the recalibrated feature maps φ are the reweighted feature maps that result from the application of the attention A to the feature maps G. In the process 1400, N is a channel number, W is a channel width, and H is a channel height.

In FIG. 14, the intermediate feature maps of the NN filter model are denoted as G, where $G \in R^{N \times W \times H}$. The obtained attention is denoted as A, where $A \in R^{W \times H}$ represents the obtained attention. In this context, the $\in$ symbol indicates that G is an element of a set given by $R^{N \times W \times H}$, and that A is an element of a set given by $R^{W \times H}$.

For example, R is a domain that a specific element in the feature map or attention belongs to. R may be a domain including any real numbers, or a domain including any integer real numbers. In some examples, a feature map is a two-dimensional or three-dimensional array. Accordingly, a feature map G, such as an intermediate feature map G, where $G \in R^{N \times W \times H}$, indicates that each element of the feature map G belongs to R, and there are N×W×H elements in the feature map G. In this example, having values for N, W, and H indicates that the feature map G is a three-dimensional array, with the dimensionality of the value of N, W, and H, respectively, along each dimension. In another example, such as an attention A, where $A \in R^{W \times H}$, each element of the attention A belongs to R, and there are W×H elements in the attention A. In this example, having values for W and H indicates that the attention A is a two-dimensional array, with the dimensionality of the value of W and H, respectively, along each dimension.

In one example, the recalibrated feature maps are generated according to:

$\phi^{i,j,k} = G^{i,j,k} \times A^{j,k}$, 1≤i≤N, 1≤j≤W, and 1≤k≤H.

In another example, the recalibrated feature maps are generated according to:

$\phi^{i,j,k} = G^{i,j,k} \times f(A^{j,k})$, 1≤i≤N, 1≤j≤W, 1≤k≤H, and f represents a mapping function applied on each element of the attention.

In yet another example, the recalibrated feature maps are generated according to:

$\phi^{i,j,k} = G^{i,j,k} \times f(A^{j,k}) + G^{i,j,k}$, 1≤i≤N, 1≤j≤W, 1≤k≤H, and f represents a mapping function applied on each element of the attention.

As described above, residual blocks are utilized as the basic module of NN models, and multiple residual blocks can be stacked to construct the final network. For example, a residual block can be obtained by combining a convolutional layer, a ReLU/PreLU activation function, and another convolutional layer as shown in FIG. 12B. Accordingly, in at least some examples, an attention is only applied to the last layer (e.g., on a feature map output of the last layer) of a residual block, rather than on every layer of the residual block. An example of applying an attention in this way is also shown in FIG. 16B, discussed further below.

In another example, an attention is only applied to specified layers (e.g., on feature maps output by the specified layers) of the NN filter model, rather than on every layer of the NN filter model. The specified layers may be specified by a topological structure of the NN filter model.

FIG. 15 is an example of a process 1500 for applying a neural network filter having a configurable depth to an unfiltered sample of a video unit to generate a filtered sample. In the process 1500 shown in FIG. 15, at least some unfiltered samples are provided as an input to the filtering system 1502. In an example, an unfiltered sample is a sample (e.g., a pixel) of a video unit that has not been subjected to any filtering yet, or has not been subjected to a sufficient amount of filtering yet. The output of the filtering system 1502 may thus be a filtered sample.

The filtering system 1502 includes NN filter 1504 based on an NN filter model having a first depth, and a NN filter 1506 based on an NN filter model having a second depth. The depth of the filtering system 1502, or the NN filter models thereof, is thus configurable. The NN filters 1504, 1506 are similar to those described above, such as with respect to FIGS. 12A and 12B. As described above, the NN filters 1504, 1506 include multiple residual blocks, and the number of residual blocks of each NN filter 1504, 1506 is a depth of that NN filter 1504, 1506. The example shown in FIG. 15 is illustrative, and in other examples the filtering system 1502 may include more than two filters (e.g., the two-filter example shown is not intended to be limiting unless explicitly stated). Accordingly, more than two depths may be implemented by the applied NN filter(s).

As described above, in some examples, NN filter models may have different depths, which may be selected in a predefined manner, or derived in an on-the-fly manner. In some cases, the filtering system 1502 includes a NN filter having a configurable depth, which is represented by the NN filter 1504 (based on a filter model having a first depth) and the NN filter 1506 (based on a filter model having a second depth). In other cases, the filtering system 1502 includes multiple NN filters 1504, 1506, each based on an NN filter model having a different depth, and one of the NN filters 1504, 1506 is selected (e.g., by filter selection logic 1508) to be used as the NN filter, depending on various characteristics of the video unit or unfiltered sample thereof.

In various examples, a NN filter is applied to the unfiltered sample to generate a filtered sample. In FIG. 15, a depth of the NN filter model is selectable, and thus the NN filter may be a first NN filter 1504 (using a NN filter model having a first depth) or a second NN filter 1506 (using a NN filter model having a second depth). The filtering system 1502 includes filter selection logic 1508, which is configured to determine a depth to be applied to the unfiltered sample, and select one of the NN filters 1504, 1506 (or filter models used thereby) based on the depth to be applied. For example, the filter selection logic 1508 may determine to apply the NN filter 1504 having a first depth to a first video unit, and to apply the NN filter 1506 having a second depth to a second video unit.

Irrespective of the depth of the NN filter model selected by the filter selection logic 1508, applying the NN filter having a certain depth to the unfiltered sample generates the filtered sample (e.g., an output of the filtering system 1502). A conversion between a video media file and a bitstream can then be performed based on the filtered sample that was generated, as described above.

In an example, the filter selection logic 1508 is configured to determine the depth based on one or more of: a temporal layer of the video unit, a type of a slice or a picture (e.g., 'i' for intra, 'e' for inter, or 'b' for bidirectional) that contains the video unit, a list of reference pictures that are matched to the video unit, a color component of the video unit, and a color format (e.g., luma-chroma or RGB) of the video unit.

In some examples, the filter selection logic 1508 is configured to determine to apply NN filter models having different depths to different video units in a picture or a slice. For example, the NN filter 1504 is selected for a first video unit in the picture or the slice, while the NN filter 1506 is selected for a second video unit in the picture or the slice.

In other examples, the filter selection logic 1508 is configured to determine to apply NN filter models having different depths to different video units in different pictures or slices. For example, the NN filter 1504 is selected for a first video unit in a first picture or a first slice, while the NN filter 1506 is selected for a second video unit in a second picture or a second slice.

In still other examples, the filter selection logic 1508 is configured to determine to apply NN filter models having different depths to video units based on a temporal layer or a slice type of the video unit. In some cases, temporal layers are grouped into subgroups, and a NN filter model having a same depth is applied to video units in temporal layers in a particular subgroup, while NN filter models having different depths are applied to video units in temporal layers in different subgroups.

In some examples, the filter selection logic 1508 is configured to determine to apply NN filter models having different depths based on whether the video unit is a coding tree unit (CTU), a coding tree block (CTB), a row of a CTU, a row of a CTB, a slice, a tile, a picture, a sequence, or a subpicture.

The depth for a particular video unit (or the NN filter model having such depth) may also be signaled, such as by an encoder of the video unit to a decoder of the video unit. For example, the depth may be signaled to the decoder using a supplemental enhancement information (SEI) message, a sequence parameter set (SPS), a picture parameter set (PPS), an adaptation parameter set (APS), a video parameter set (VPS), a picture header, or a slice header.

In some examples, different depths (or NN filter models having such depths) are signaled for different video units. In other examples, such as where the unfiltered sample includes a luma component and a chroma component, different depths may be independently signaled for each of the luma component and the chroma component.

A discussion of the model selection is provided.

Example 1

1. A NN filter model may use external information such as a reconstruction parameter, a split or partitioning parameter, a prediction parameter, a boundary strength parameter, a QP, and the like (generally, coding parameters related to a video unit being filtered) as an input to obtain an attention. For example, the NN filter model has an attention mechanism that is based on a coding parameter input.

a. In one example, convolutional layers of the NN filter model are used to extract features from external information or both external and internal information, where the internal information refers to the features extracted inside the network while the external information refers to other information that cannot be obtained from the features inside the network, such as coding parameters related to the video unit being filtered. At least one of those extracted features will be used as attention. As described above, FIG. 14 provides an illustration of an attention mechanism in accordance with some examples, where the operation performed by the convolutional layer(s) is denoted as $\alpha$, the external information is denoted as E, the internal information is denoted as I, and the obtained attention is denoted as A.

i. In one example, E is one of a reconstruction parameter, a split or partitioning parameter, a prediction parameter, a boundary strength parameter, a QP, and the like.

ii. In one example, E could be any combination of a reconstruction parameter, a split or partitioning parameter, a prediction parameter, a boundary strength parameter, a QP, and the like.

iii. In one example, I is an intermediate feature map(s) of the NN models that will be recalibrated by the obtained attention.

iv. In one example, A=α(E).

v. In one example, A=α(E, I), where E and I are concatenated first and then fed into the convolutional layers.

vi. In one example, A=α(E), where E is a concatenation of the reconstruction image and the split image, α is a two-layer convolutional neural network, A is a single channel feature map whose spatial resolution is the same as the feature maps that A is going to apply on.

b. In one example, the obtained attention is used to recalibrate the intermediate feature maps. The intermediate feature maps of the NN model are denoted as G, where $G \in R^{N \times W \times H}$, where N, W, and H are the channel numbers, width, and height respectively. The obtained attention is denoted as A, where $A \in R^{W \times H}$ represent the obtained attention. In this context, the $\in$ symbol indicates that G is an element of a set given by $R^{N \times W \times H}$, and that A is an element of a set given by $R^{W \times H}$.

i. In one example, the process of applying the attention could be written as:

$\phi^{i,j,k} = G^{i,j,k} \times A^{j,k}$, $1 \le i \le N$, $1 \le j \le W$, $1 \le k \le H$, where $\phi$ is the recalibrated feature maps.

ii. In one example, the process of applying the attention could be written as:

$\phi^{i,j,k} = G^{i,j,k} \times f(A^{j,k})$, $1 \le i \le N$, $1 \le j \le W$, $1 \le k \le H$, where $\phi$ is the recalibrated feature maps, f stands for a mapping function applied on each element of the attention. The mapping function may be a sigmoid function, a hyperbolic tangent (e.g., tan h) function, and the like. For example, a sigmoid function is a function having a characteristic 'S'-shaped or sigmoid curve. The hyperbolic tangent function is one example of a sigmoid function.

1. In one example, for different channels of feature maps, different A and/or different f may be used.

iii. In one example, the process of applying the attention could be written as:

$\phi^{i,j,k} = G^{i,j,k} \times f(A^{j,k}) + G^{i,j,k}$, $1 \le i \le N$, $1 \le j \le W$, $1 \le k \le H$, where $\phi$ is the recalibrated feature maps, f stands for a mapping function applied on each element of the attention. The mapping function may be a sigmoid function, a hyperbolic tangent (e.g., tan h) function, and the like.

1. In one example, for different channels of feature maps, different A and/or different f may be used.

iv. In one example, the attention operation may be applied to specified layers inside the network.

1. In one example, when the network contains residual blocks, the attention operation is only applied on the feature maps from the last layer of each residual block.

Example 2

2. In a second embodiment, the external attention mechanism described here may be applied in various ways. For example, the proposed external attention mechanism can be used in any NN models for video coding, such as NN-based intra/inter prediction, NN-based super-resolution, NN-based motion compensation, NN-based reference generation, NN-based fractional pixel interpolation, NN-based in-loop/post filtering, and the like.

a. In one example, the external attention mechanism is used in NN-based in-loop filtering.

Example 3

3. In a third embodiment, a NN model depth may be specified in various ways. For example, the depth of NN models (e.g., the number of residual blocks) may be predefined or derived on-the-fly.

a. In one example, the derivation may depend on the coded information, such as temporal layers, slice/picture types, reference picture list information, characteristics of a video unit wherein the NN model is applied to, color component, color format b. In one example, the depth may be adaptive for different video units within one picture/slice.

c. In one example, the depth may be adaptive for two video units in two different pictures/slices.

d. In one example, the depth of NN models may be the same or different for video units in different temporal layers or different types of slices or different slices or different pictures, or any video units.

e. In one example, for video units in different temporal layers or different types of slices, the depth of NN models may be the same.

f. In one example, a different network depth is used for each temporal layer or each type of slice.

i. In one example, for video units in higher temporal layers, the depth of NN models is smaller.

1. In one example, the NN model for higher temporal layers comprises several residual blocks as shown in FIG. 12A. The number of residual blocks is 8 for a higher temporal layer (e.g., relative to a lower temporal layer).

ii. In one example, for video units in inter slices, the depth of NN models is smaller.

1. In one example, the NN model for the inter slice comprises several residual blocks as shown in FIG. 12A. The number of residual blocks is 8.

iii. In one example, for video units in intra slices, the depth of NN models is larger.

1. In one example, the NN model for the intra slice comprises several residual blocks as shown in FIG. 12A. The number of residual blocks is 32.

g. In one example, temporal layers are grouped into several subgroups. For each subgroup, a kind of network depth is used.

Example 4

4. In a fourth embodiment, an indication of the depth of NN models for a video unit depth may be signaled to a decoder.

a. In one example, indication of at least one depth of NN models may be signaled in SEI message/SPS/PPS/APS/VPS/picture header/slice header/CTU, etc.

b. In one example, multiple depths of NN models may be signaled to the decoder.

c. In one example, the depth of NN models for luma and the depth of NN models for chroma may be signaled to the decoder individually.

A first exemplary embodiment is discussed.

This first exemplary embodiment presents a convolutional neural network-based in-loop filtering method wherein adaptive model selection is introduced. The proposed Deep in-loop filter with Adaptive Model selection (DAM) method is developed from the prior contribution JVET-V0100, introducing a new network structure to the code base of VTM-11.0+NewMCTF. Compared with VTM-11.0+NewMCTF, the proposed method demonstrates BD-rate reductions for {Y, Cb, Cr}, under AI, RA, and LDB configurations.

In this first exemplary embodiment, convolutional neural networks (CNN) are utilized to construct in-loop filters for reducing the distortion incurred during compression. The network structure is revised from the one discussed in Yue Li, Li Zhang, Kai Zhang, "Deep in-loop filter with adaptive model selection," JVET-V0100. Similar to JVET-V0100, residual blocks are utilized as the basic module and stacked several times to construct the final network. As a further development from JVET-V0100, external attention mechanism is introduced in this contribution, leading to an increased representation capability with a similar model size. In addition, to deal with different types of content, individual networks are trained for different types of slices and quality levels.

The first exemplary embodiment is related to that shown in FIGS. 12A and 12B. To improve the architecture, FIGS. 16A and 16B are now introduced, which include the external attention mechanism. FIG. 16A is a schematic block diagram of architecture 1600 of a NN filtering method in accordance with various examples, and FIG. 16B is a schematic block diagram showing the construction of an attention residual block 1650 used in the architecture 1600 of FIG. 16A in accordance with various examples.

In addition to the attention residual block 1650, other parts of the architecture 1600 are the same as those in JVET-V0100. The calculation process in the attention module 1650 can be written as:

$$F\_out = F\_in \times f(Rec, Pred) + F\_in$$

Where F_in and F_out denote the input and the output of the attention module 1650, respectively. Rec and Pred stand for the reconstruction and the prediction, respectively. In this example, f comprises 2 convolutional layers, where an activation function is applied after the first convolutional layer. The objective off is to generate a spatial attention map from external information, which then recalibrates the feature maps F_in.

In the proposed technique of the first exemplary embodiment, each slice or block could determine whether to apply the CNN-based filter or not When the CNN-based filter is determined to be applied to a slice/block, which model from a candidate model list including three models could be further decided. To this end, individual models are trained with QPs in {17, 22, 27, 32, 37, 42}. Given a test QP for a sequence, denoted as q, the candidate model list includes models trained with QPs equal to {q, q–5, q–10}. The selection process is based on the rate-distortion cost at the encoder side. Indication of on/off control as well as the model index, if needed, are signalled in the bitstream. Other details regarding the model selection are provided as below.

The granularity of the filter determination and the model selection is dependent on resolution and QP. In the proposed scheme, given a higher resolution and a larger QP, the determination and selection will be performed for a larger region.

The candidate model list is different across different temporal layers. For a low temporal layer, the third candidate is replaced by the intra-slice NN filter model if the ratio of intra-coded samples is no smaller than a threshold. For a high temporal layer, the third candidate, i.e. the model corresponding to q–10, is replaced by the model corresponding to q+5.

For all-intra configuration, model selection is disabled while on/off control is still preserved.

An open source machine learning framework, such as PyTorch, is useful for performing the inference of the proposed CNN filters in VTM. The network information in the inference stage is provided in Table 1-1 as suggested by S. Liu, A. Segall, E. Alshina, R.-L. Liao., "JVET common test conditions and evaluation procedures for neural network-based video coding technology," JVET-V2016.

TABLE 1-1

Network Information for NN-based
Video Coding Tool Testing in Inference Stage
Network Information in Inference Stage

| | | |
|---|---|---|
| Mandatory | HW environment: | |
| | GPU Type | N/A |
| | Framework: | PyTorch v1.6 |
| | Number of GPUs per Task | 0 |
| | Total Parameter Number | 5.51M/model |
| | Parameter Precision (Bits) | 32 (F) |
| | Memory Parameter (MB) | ~22.1M/model, 24 models in total |
| | MAC (Giga) | 1.43M/pixel |
| Optional | Total Conv. Layers | 69 + 64 |
| | Total FC Layers | 0 |
| | Total Memory (MB) | |
| | Batch size: | 1 |
| | Patch size | 32 × 32, 64 × 64, 128 × 128, 256 × 256 |
| | Changes to network configuration or weights required to generate rate points | |
| | Peak Memory Usage | |
| | Other information: | |

PyTorch may also be used as the training platform. The DIV2K (from https://dala.vision.ee.ethz.ch/cvl/DIV2K/, R Timofte, E. Agustsson, S. Gu, J. Wu, A. Ignatov, L. V. Gool) and BVI-DVC (from Ma, Di, Fan Zhang, and David R Bull. "BVI-DVC: A Training Database for Deep Video Compression." arXiv preprint arXiv:2003.13552 (2020)) datasets are adopted to train the CNN filters of I slices and B slices, respectively. Different CNN models are trained to adapt to different QP points. The network information in the training stage is provided in Table 1-2 as suggested by S. Liu, A. Segall, E. Alshina, K-L. Liao., "JVET common test conditions and evaluation procedures for neural network-based video coding technology," JVET-V2016.

TABLE 1-2

Network Information for NN-based
Video Coding Tool Testing in Training Stage
Network Information in Training Stage

| | | |
|---|---|---|
| Mandatory | GPU Type | GPU: Tesla-V100-SXM2-32GB |
| | Framework: | PyTorch v1.6 |
| | Number of GPUs per Task | 2 |
| | Epoch: | 90 |
| | Batch size: | 64 |
| | Training time: | 60 h/model |
| | Training data information: | DIV2K, BVI-DVC |
| | Training configurations for generating compressed training data (if different to VTM CTC): | VTM-11.0 + new MCTF, QP {17, 22, 27, 32, 37, 42} |
| | Loss function: | L1, L2 |
| Optional | Number of iterations | |
| | Patch size | 128 × 128 |
| | Learning rate: | 1e–4 |
| | Optimizer: | ADAM |
| | Preprocessing: | |
| | Other information: | |

The proposed CNN-based in-loop filtering method is tested on top of VTM-11.0+new MCTF (from https://vcgit.hhi.fraunhofer.deljvet/WVCSoftware_VTM/-/tags/VTM-11.0) according to the common test conditions suggested by S. Liu, A. Segall, E. Alshina, PR-L. Liao., "JVET common test conditions and evaluation procedures for neural network-based video coding technology," JVET-V2016. The new MCTF patch is from https://vcgit.hhi.fmunhofer.de/jvet-ahg-nnvc/nnvc-ctc-/treetmaster/Software%20Patches.

Deblocking filtering and SAO are disabled while ALF (and CCALF) is placed after the proposed CNN-based filtering. Test results are shown in Table 1-3 through Table 1-5. Under AI configurations, the proposed method can bring 9.12%, 22.39%, and 22.60% BD-rate reductions on average for Y, Cb, and Cr, respectively. Under RA configurations, the proposed method can bring 12.32%, 27.48%, and 27.22% BD-rate reductions on average for Y, Cb, and Cr, respectively. Under LDB configurations, the proposed method can bring %, %, and % BD-rate reductions on average for Y, Cb, and Cr, respectively.

TABLE 1-3

Performance of the proposed method on top of VTM11.0 + new MCTF (RA)

| | RA | | | | |
| | YUV | Y | U | V | EncT | DecT |
|---|---|---|---|---|---|---|
| Class A1 | −14.27% | −11.23% | −21.85% | −22.49% | 316% | 106894% |
| Class A2 | −15.97% | −12.91% | −26.09% | −26.30% | 300% | 100508% |
| Class B | −15.87% | −11.87% | −31.12% | −28.84% | 308% | 100969% |
| Class C | −16.51% | −13.27% | −28.19% | −29.42% | 237% | 93822% |
| Class E | | | | | | |
| Overall | −15.74% | −12.32% | −27.48% | −27.22% | 287% | 100056% |
| Class D | −18.11% | −14.95% | −29.89% | −30.63% | 223% | 87872% |
| Class F | −8.69% | −6.31% | −17.37% | −17.62% | 436% | 39043% |

TABLE 1-4

Performance of the proposed method on top of VTM11.0 + new MCTF (LDB)

| | LDB | | | | |
| | YUV | Y | U | V | EncT | DecT |
|---|---|---|---|---|---|---|
| Class A1 | | | | | | |
| Class A2 | | | | | | |
| Class B | | | | | | |
| Class C | −15.61% | −12.20% | −29.61% | −30.35% | 241% | 99462% |
| Class E | −12.82% | −9.96% | −24.12% | −22.77% | 611% | 80736% |
| Overall | | | | | | |
| Class D | −17.06% | −13.52% | −32.93% | −33.23% | 227% | 90645% |
| Class F | −9.31% | −6.87% | −19.80% | −18.48% | 442% | 47851% |

TABLE 1-5

Performance of the proposed method on top of VTM11.0 + new MCTF (AI)

| | AI | | | | |
| | YUV | Y | U | V | EncT | DecT |
|---|---|---|---|---|---|---|
| Class A1 | −10.74% | −7.78% | −18.09% | −17.37% | 253% | 71308% |
| Class A2 | −11.27% | −8.14% | −22.53% | −22.32% | 182% | 58999% |
| Class B | −10.97% | −8.21% | −23.36% | −22.65% | 167% | 55609% |
| Class C | −12.33% | −9.71% | −21.56% | −24.03% | 134% | 37708% |
| Class E | −15.15% | −12.18% | −26.02% | −26.11% | 179% | 60865% |
| Overall | −11.98% | −9.12% | −22.39% | −22.60% | 175% | 54509% |

TABLE 1-5-continued

Performance of the proposed method on top of VTM11.0 + new MCTF (AI)

| | AI | | | | |
| | YUV | Y | U | V | EncT | DecT |
|---|---|---|---|---|---|---|
| Class D | −12.03% | −9.36% | −22.81% | −24.31% | 125% | 32717% |
| Class F | −6.35% | −4.82% | −13.56% | −11.69% | 132% | 21437% |

The first exemplary embodiment presents a CNN-based in-loop filtering method. The proposed CNN-based filtering method demonstrates useful coding gains.

Turning now to FIG. 17, a block diagram showing an example video processing system 1700 in which various techniques disclosed herein may be implemented. Various implementations may include some or all of the components of the video processing system 1700. The video processing system 1700 may include input 1702 for receiving video content The video content may be received in a raw or uncompressed format, e.g., 8- or 10-bit multi-component pixel values, or may be in a compressed or encoded format. The input 1702 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 1700 may include a coding component 1704 that may implement the various coding or encoding methods described in the present document. The coding component 1704 may reduce the average bitrate of video from the input 1702 to the output of the coding component 1704 to produce a coded representation of the video. The coding techniques are therefore sometimes called video compression or video transcoding techniques. The output of the coding component 1704 may be either stored, or transmitted via a communication connected, as represented by the component 1706. The stored or communicated bitstream (or coded) representation of the video received at the input 1702 may be used by the component 1708 for generating pixel values or displayable video that is sent to a display interface 1710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

FIG. 18 is a block diagram of a video processing apparatus 1800. The apparatus 1800 may be used to implement one or more of the methods described herein. The apparatus 1800 may be embodied in a smartphone, tablet, computer, Internet of Things (IoT) receiver, and so on. The apparatus 1800 may include one or more processors 1802, one or more memories 1804 and video processing hardware 1806 (a.k.a., video processing circuitry). The processor(s) 1802 may be configured to implement one or more methods described in the present document. The memory (memories) 1804 may be used for storing data and code used for implementing the methods and techniques described herein. The video processing hardware 1806 may be used to implement, in hardware circuitry, some techniques described in the present document. In some embodiments, the hardware 1806 may be partly or completely located within the processor 1802, e.g., a graphics processor.

FIG. 19 is a block diagram that illustrates an example video coding system 1900 that may utilize the techniques of this disclosure. As shown in FIG. 19, the video coding system 1900 may include a source device 1910 and a destination device 1920. Source device 1910 generates encoded video data which may be referred to as a video encoding device. Destination device 1920 may decode the encoded video data generated by source device 1910 which may be referred to as a video decoding device.

Source device 1910 may include a video source 1912, a video encoder 1914, and an input/output (I/O) interface 1916.

Video source 1912 may include a source such as a video capture device, an interface to receive video data from a video content provider, and/or a computer graphics system for generating video data, or a combination of such sources. The video data may comprise one or more pictures. Video encoder 1914 encodes the video data from video source 1912 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1916 may include a modulator/demodulator (modem) and/or a transmitter. The encoded video data may be transmitted directly to destination device 1920 via I/O interface 1916 through network 1930. The encoded video data may also be stored onto a storage medium/server 1940 for access by destination device 1920.

Destination device 1920 may include an I/O interface 1926, a video decoder 1924, and a display device 1922.

I/O interface 1926 may include a receiver and/or a modem. I/O interface 1926 may acquire encoded video data from the source device 1910 or the storage medium/server 1940. Video decoder 1924 may decode the encoded video data. Display device 1922 may display the decoded video data to a user. Display device 1922 may be integrated with the destination device 1920, or may be external to destination device 1920 which may be configured to interface with an external display device.

Video encoder 1914 and video decoder 1924 may operate according to a video compression standard, such as the High Efficiency Video Coding (HEVC) standard, Versatile Video Coding (VVC) standard, and other current and/or further standards.

FIG. 20 is a block diagram illustrating an example of video encoder 2000, which may be video encoder 1914 in the video coding system 1900 illustrated in FIG. 19.

Video encoder 2000 may be configured to perform any or all of the techniques of this disclosure. In the example of FIG. 20, video encoder 2000 includes a plurality of functional components. The techniques described in this disclosure may be shared among the various components of video encoder 2000. In some examples, a processor may be configured to perform any or all of the techniques described in this disclosure.

The functional components of video encoder 2000 may include a partition unit 2001, a prediction unit 2002 which may include a mode select unit 2003, a motion estimation unit 2004, a motion compensation unit 2005 and an intra prediction unit 2006, a residual generation unit 2007, a transform unit 2008, a quantization unit 2009, an inverse quantization unit 2010, an inverse transform unit 2011, a reconstruction unit 2012, a buffer 2013, and an entropy encoding unit 2014.

In other examples, video encoder 2000 may include more, fewer, or different functional components. In an example, prediction unit 2002 may include an intra block copy (IBC) unit The IBC unit may perform prediction in an IBC mode in which at least one reference picture is a picture where the current video block is located.

Furthermore, some components, such as motion estimation unit 2004 and motion compensation unit 2005 may be highly integrated, but are represented in the example of FIG. 20 separately for purposes of explanation.

Partition unit 2001 may partition a picture into one or more video blocks. Video encoder 1914 and video decoder 1924 of FIG. 19 may support various video block sizes.

Mode select unit 2003 may select one of the coding modes, intra or inter, e.g., based on error results, and provide the resulting intra- or inter-coded block to a residual generation unit 2007 to generate residual block data and to a reconstruction unit 2012 to reconstruct the encoded block for use as a reference picture. In some examples, mode select unit 2003 may select a combination of intra and inter prediction (CIIP) mode in which the prediction is based on an inter prediction signal and an intra prediction signal. Mode select unit 2003 may also select a resolution for a motion vector (e.g., a sub-pixel or integer pixel precision) for the block in the case of inter-prediction.

To perform inter prediction on a current video block, motion estimation unit 2004 may generate motion information for the current video block by comparing one or more reference frames from buffer 2013 to the current video block. Motion compensation unit 2005 may determine a predicted video block for the current video block based on the motion information and decoded samples of pictures from buffer 2013 other than the picture associated with the current video block.

Motion estimation unit 2004 and motion compensation unit 2005 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 2004 may perform uni-directional prediction for the current video block, and motion estimation unit 2004 may search reference pictures of list 0 or list 1 for a reference video block for the current video block. Motion estimation unit 2004 may then generate a reference index that indicates the reference picture in list 0 or list 1 that contains the reference video block and a motion vector that indicates a spatial displacement between the current video block and the reference video block. Motion estimation unit 2004 may output the reference index, a prediction direction indicator, and the motion vector as the motion information of the current video block. Motion compensation unit 2005 may generate the predicted video block of the current block based on the reference video block indicated by the motion information of the current video block.

In other examples, motion estimation unit 2004 may perform bi-directional prediction for the current video block, motion estimation unit 2004 may search the reference pictures in list 0 for a reference video block for the current video block and may also search the reference pictures in list 1 for another reference video block for the current video block. Motion estimation unit 2004 may then generate reference indexes that indicate the reference pictures in list 0 and list 1 containing the reference video blocks and motion vectors that indicate spatial displacements between the reference video blocks and the current video block. Motion estimation unit 2004 may output the reference indexes and the motion vectors of the current video block as the motion information of the current video block. Motion compensation unit 2005 may generate the predicted video block of the current video block based on the reference video blocks indicated by the motion information of the current video block.

In some examples, motion estimation unit 2004 may output a full set of motion information for decoding processing of a decoder.

In some examples, motion estimation unit 2004 may not output a full set of motion information for the current video. Rather, motion estimation unit 2004 may signal the motion information of the current video block with reference to the motion information of another video block. For example, motion estimation unit 2004 may determine that the motion information of the current video block is sufficiently similar to the motion information of a neighboring video block.

In one example, motion estimation unit 2004 may indicate, in a syntax structure associated with the current video block, a value that indicates to the video decoder 1924 that the current video block has the same motion information as another video block.

In another example, motion estimation unit 2004 may identify, in a syntax structure associated with the current video block, another video block and a motion vector difference (MVD). The motion vector difference indicates a difference between the motion vector of the current video block and the motion vector of the indicated video block. The video decoder 1924 may use the motion vector of the indicated video block and the motion vector difference to determine the motion vector of the current video block.

As discussed above, video encoder 1914 may predictively signal the motion vector. Two examples of predictive signaling techniques that may be implemented by video encoder 1914 include advanced motion vector prediction (AMVP) and merge mode signaling.

Intra prediction unit 2006 may perform intra prediction on the current video block. When intra prediction unit 2006 performs intra prediction on the current video block, intra prediction unit 2006 may generate prediction data for the current video block based on decoded samples of other video blocks in the same picture. The prediction data for the current video block may include a predicted video block and various syntax elements.

Residual generation unit 2007 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 2007 may not perform the subtracting operation.

Transform unit 2008 may generate one or more transform coefficient video blocks for the current video block by applying one or more transforms to a residual video block associated with the current video block.

After transform unit 2008 generates a transform coefficient video block associated with the current video block, quantization unit 2009 may quantize the transform coefficient video block associated with the current video block based on one or more quantization parameter (QP) values associated with the current video block.

Inverse quantization unit 2010 and inverse transform unit 2011 may apply inverse quantization and inverse transforms to the transform coefficient video block, respectively, to reconstruct a residual video block from the transform coefficient video block. Reconstruction unit 2012 may add the reconstructed residual video block to corresponding samples from one or more predicted video blocks generated by the prediction unit 2002 to produce a reconstructed video block associated with the current block for storage in the buffer 2013.

After reconstruction unit 2012 reconstructs the video block, loop filtering operation may be performed to reduce video blocking artifacts in the video block.

Entropy encoding unit 2014 may receive data from other functional components of the video encoder 2000. When entropy encoding unit 2014 receives the data, entropy encoding unit 2014 may perform one or more entropy encoding operations to generate entropy encoded data and output a bitstream that includes the entropy encoded data.

FIG. 21 is a block diagram illustrating an example of video decoder 2100, which may be video decoder 1924 in the video coding system 1900 illustrated in FIG. 19.

The video decoder 2100 may be configured to perform any or all of the techniques of this disclosure. In the example of FIG. 21, the video decoder 2100 includes a plurality of functional components. The techniques described in this disclosure may be shared among the various components of the video decoder 2100. In some examples, a processor may be configured to perform any or all of the techniques described in this disclosure.

In the example of FIG. 21, video decoder 2100 includes an entropy decoding unit 2101, a motion compensation unit 2102, an intra prediction unit 2103, an inverse quantization unit 2104, an inverse transformation unit 2105, and a reconstruction unit 2106 and a buffer 2107. Video decoder 2100 may, in some examples, perform a decoding pass generally reciprocal to the encoding pass described with respect to video encoder 1914 (FIG. 19).

Entropy decoding unit 2101 may retrieve an encoded bitstream. The encoded bitstream may include entropy coded video data (e.g., encoded blocks of video data). Entropy decoding unit 2101 may decode the entropy coded video data, and from the entropy decoded video data, motion compensation unit 2102 may determine motion information including motion vectors, motion vector precision, reference picture list indexes, and other motion information. Motion compensation unit 2102 may, for example, determine such information by performing the AMVP and merge mode signaling.

Motion compensation unit 2102 may produce motion compensated blocks, possibly performing interpolation based on interpolation filters. Identifiers for interpolation filters to be used with sub-pixel precision may be included in the syntax elements.

Motion compensation unit 2102 may use interpolation filters as used by video encoder 1914 during encoding of the video block to calculate interpolated values for sub-integer pixels of a reference block. Motion compensation unit 2102 may determine the interpolation filters used by video encoder 1914 according to received syntax information and use the interpolation filters to produce predictive blocks.

Motion compensation unit 2102 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 2103 may use intra prediction modes for example received in the bitstream to form a prediction block from spatially adjacent blocks. Inverse quantization unit 2104 inverse quantizes, i.e., de-quantizes, the quantized video block coefficients provided in the bitstream and decoded by entropy decoding unit 2101. Inverse transform unit 2105 applies an inverse transform.

Reconstruction unit 2106 may sum the residual blocks with the corresponding prediction blocks generated by motion compensation unit 2102 or intra-prediction unit 2103 to form decoded blocks. If desired, a deblocking filter may also be applied to filter the decoded blocks in order to remove blockiness artifacts. The decoded video blocks are then stored in buffer 2107, which provides reference blocks for subsequent motion compensation/intra prediction and also produces decoded video for presentation on a display device.

FIG. 22 is a method 2200 for coding video data according to an embodiment of the disclosure. The method 2200 may be performed by a coding apparatus (e.g., an encoder) having a processor and a memory. The method 2200 may be implemented to provide a NN filter model that has a depth (e.g., a number of residual blocks of the filter model) that is configurable. For example, a first NN filter model has a first depth and a second NN filter model has a second depth. Selecting one of the first or second NN filter models thus enables a depth of the NN filter model to be configurable (e.g., either the first or the second depth). Such a NN filter model allows different filter model depths to be applied to different video units, determined in a predefined or on-the-fly manner. As described above, in other examples more than two filter models (e.g., more than two depths) may be implemented by the applied NN filter(s).

In block 2202, the coding apparatus applies a neural network (NN) filter to an unfiltered sample of a video unit to generate a filtered sample. The NN filter is based on an NN filter model having a depth that is configurable, where the depth is a number of residual blocks of the NN filter model. In an embodiment, an unfiltered sample is a sample (or pixel) that has not yet been subjected to any filtering process, or has not yet been sufficiently filtered. For example, the unfiltered sample has not been subjected to any NN filter. As another example, the unfiltered sample has not been subjected to an NN filter, an adaptive loop filter (ALF), a deblocking filter (DF), a sample adaptive offset (SAO) filter, or combinations thereof.

In block 2204, the coding apparatus converts between a video media file and a bitstream based on the filtered sample that was generated.

When implemented in an encoder, converting includes receiving a media file (e.g., a video unit) and encoding a filtered sample into a bitstream. When implemented in a decoder, converting includes receiving a bitstream including a filtered sample, and decoding the bitstream to obtain the filtered sample.

In an embodiment, the method 2200 may utilize or incorporate one or more of the features or processes of the other methods disclosed herein.

In one example, a non-transitory computer readable medium stores a bitstream of a video that is generated by a method, such as all or part of the method 2200, performed by a video processing apparatus (e.g., video processing apparatus 1800, described above). For example, the bitstream may be generated by applying a NN filter to an unfiltered sample of a video unit to generate a filtered sample. As described above, the NN filter is based on an NN filter model generated using a quality-level indicator (QI) input, and the bitstream is generated based on the filtered sample.

A listing of solutions preferred by some embodiments is provided next.

The following solutions show example embodiments of techniques discussed in the present disclosure (e.g., Example 1).

1. A method of video processing, comprising: performing a conversion between a video comprising a video block and a bitstream of the video based on a rule, wherein the conversion includes filtering at least some samples of the video block using a neural network (NN) filter that uses one or more NN models, and wherein the rule specifies that the one or more NN models are equipped with an attention mechanism based on external information of the video.

2. The method of solution 1, wherein the rule specifies that convolutional layers of the NN are used for extracting features from the external information, and using the extracted features E as an attention A in the one or more NN models.

3. The method of solution 2, wherein the rule specifies to use internal information I for determining A.

4. The method of solution 3, wherein I includes an intermediate feature map of the one or more NN models.

5. The method of any of solutions 2-4, wherein the rule specifies that A is obtained only from E and without using I.

6. The method of any of solutions 2-4, wherein the rule specifies that A is obtained by concatenating E with I.

7. The method of any of solutions 2-6, wherein the rule specifies that A is obtained using a two-layer convolutional neural network.

8. The method of any of solutions 2-7, wherein the conversion includes: recalibrating intermediate feature maps of the video using the attention A.

9. The method of solution 8, wherein the intermediate feature maps of the one or more NN model as represented as $G{\in}R^{N{\times}W{\times}H}$, where N, W, and H are the channel numbers, width, and height respectively, and wherein the attention A is represented as $A{\in}R^{W{\times}H}$.

10. The method of solution 9, wherein the applying the attention is: $\phi^{i,j,k}=G^{i,j,k}{\times}A^{j,k}$, $1{\le}i{\le}N$, $1{\le}j{\le}W$, $1{\le}k{\le}H$, where $\phi$ is the recalibrated feature maps.

11. The method of solution 10, wherein the process of applying the attention is: $\phi^{i,j,k}=G^{i,j,k}{\times}f(A_{j,k})$, $1{\le}i{\le}N$, $1{\le}j{\le}W$, $1{\le}k{\le}H$, where $\phi$ is the recalibrated feature maps, f stands for a mapping function applied on each element of the attention.

12. The method of solution 11, wherein the function is a sigmoid function or a tan h function.

13. The method of solutions 11-12, wherein for different channels of feature maps, different A and/or different f are used.

14. The method of solution 10, wherein the applying attention is: $\phi^{i,j,k}=G^{i,j,k}{\times}f(A^{j,k})+G^{i,j,k}$, $1{\le}i{\le}N$, $1{\le}j{\le}W$, $1{\le}k{\le}H$, where $\phi$ is the recalibrated feature maps, f stands for a mapping function applied on each element of the attention.

15. The method of solution 14, wherein for different channels of feature maps, different A and/or different f may be used.

16. The method of solutions 10-15, wherein, the attention operation may be applied to specified layers inside the NN.

17. The method of any of solutions 10-16, wherein the rule specifies that when the NN contains residual blocks, the attention operation is only applied on the feature maps from the last layer of each residual block.

18. The method of solution 14, wherein the function is a sigmoid function or a tan h function.

19. The method of any of solutions 1-18, wherein the external information includes splitting scheme for the video block.

20. The method of solutions 1-18, wherein the external information includes a prediction mode of the video block.

21. The method of any of solutions 1-18, wherein the external information includes a quantization parameter associated with the video block.

22. The method of any of solutions 1-21, wherein the external information includes a boundary strength parameter for a boundary of the video block.

The following solutions show example embodiments of techniques discussed in the present disclosure (e.g., Examples 3 and 4).

23. The method of any of solutions 1-21, wherein a depth of the one or more NN models is determined according to a depth rule.

24. The method of solution 23, wherein the depth rule specifies the depth as having a predetermined value.

25. The method of solution 23, wherein the depth is derivable on an on-the-fly manner.

26. The method of any of solutions 23-25, wherein the depth corresponds to a number of residual blocks.

27. The method of any of solutions 23-26, wherein the depth rule is based on a coded information of the video block.

28. The method of any of solutions 23-27, wherein the depth rule is adaptive.

29. The method of any of solutions 23-28, wherein the depth rule causes a value of the depth to change among different pictures.

30. The method of any of solutions 23-29, wherein one or more syntax elements indicative of the depth are included in the bitstream.

31. The method of any of solutions 23-30, wherein one or more syntax elements indicative of the depth are indicated to the decoder.

32. The method of any of solutions 30-31, wherein the one or more syntax elements include a syntax element indicative of a depth for a luma and a syntax element indicative of a depth for a chroma component 33. The method of any of solutions 1-32, wherein the conversion comprises generating the bitstream from the video.

34. The method of any of solutions 1-32, wherein the conversion comprises generating the video from the bitstream.

35. A video decoding apparatus comprising a processor configured to implement a method recited in one or more of solutions 1 to 34.

36. A video encoding apparatus comprising a processor configured to implement a method recited in one or more of solutions 1 to 34.

37. A computer program product having computer code stored thereon, the code, when executed by a processor, causes the processor to implement a method recited in any of solutions 1 to 34.

38. A computer readable medium having a bitstream stored thereupon, the bitstream being generated by a method recited in any of solutions 1 to 34.

39. A method of generating a bitstream, comprising: generating a bitstream using one or more of solutions 1-34 and writing the bitstream to a computer-readable medium.

40. A method, an apparatus or a system described in the present document

The following documents are incorporated by reference in their entirety:

[1] Johannes Ballé, Valero Laparra, and Eero P Simoncelli, "End-to-end optimization of nonlinear transform codes for perceptual quality," PCS IEEE (2016), 1-5.

[2] Lucas Theis, Wenzhe Shi, Andrew Cunningham, and Ferenc Huszár, "Lossy image compression with compressive autoencoders," arXiv preprint arXiv: 1703.00395 (2017).

[3] Jiahao Li, Bin Li, Jizheng Xu, Ruiqin Xiong, and Wen Gao, "Fully Connected Network-Based Intra Prediction for Image Coding, "IEEE Transactions on Image Processing" 27, 7 (2018), 3236-3247.

[4] Yuanying Dai, Dong Liu, and Feng Wu, "A convolutional neural network approach for post-processing in HEVC intra coding," MMM. Springer, 28-39.

[5] Rui Song, Dong Liu, Houqiang Li, and Feng Wu, "Neural network-based arithmetic coding of intra prediction modes in HEVC," VCIP IEEE (2017), 1-4.

[6] J. Pfaff, P. Helle, D. Maniry, S. Kaltenstadler, W. Samek, H. Schwarz, D. Marpe, and T. Wiegand, "Neural network based intra prediction for video coding," Applications of Digital Image Processing XLI, Vol. 10752. International Society for Optics and Photonics, 1075213 (2018).

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document

What is claimed is:

1. A method implemented by a video coding apparatus, comprising:

applying a neural network (NN) filter to an unfiltered sample of a video unit to generate a filtered sample, wherein the NN filter is based on a first NN filter model having a first depth, or a second NN filter model having a second depth, wherein the depth comprises a number of residual blocks of the respective NN filter model, and wherein the second depth is different than the first depth; and performing a conversion between a video media file and a bitstream based on the filtered sample, wherein the NN filter uses the first NN filter model for a first video unit in a first temporal layer or a first type of slice, and wherein the NN filter uses the second NN filter model for a second video unit in a second temporal layer or a second type of slice, and wherein the NN filter uses the first NN filter model for a third video unit in a third temporal layer, wherein the first temporal layer and the third temporal layer are in a same subgroup of temporal layers, and wherein the second temporal layer is in a different subgroup of temporal layers.

2. The method of claim 1, wherein the video unit is a first video unit, wherein when the NN filter is applied to the first video unit, the NN filter uses the first NN filter model, and wherein when the NN filter is applied to a second video unit, the NN filter uses the second NN filter model.

3. The method of claim 1, further comprising determining whether to use the first or second NN filter model based on a temporal layer of the video unit, a type of a slice or a picture that contains the video unit, a list of reference pictures that are matched to the video unit, a color component of the video unit, a color format of the video unit, or combinations thereof.

4. The method of claim 1, wherein the NN filter uses the first NN filter model for a first video unit in a picture or a slice, and wherein NN filter uses the second NN filter model for a second video unit in the picture or the slice.

5. The method of claim 1, wherein the NN filter uses the first NN filter model for a first video unit in a first picture or a first slice, and wherein the NN filter uses the second NN filter model for a second video unit in a second picture or a second slice.

6. The method of claim 1, wherein determining whether to use the first or second NN filter model is based on whether the video unit is a coding tree unit (CTU), a coding tree block (CTB), a row of a CTU, a row of a CTB, a slice, a tile, a picture, a sequence, or a subpicture.

7. The method of claim 1, wherein the NN filter uses the first NN filter model for a first video unit in a first temporal layer, wherein the NN filter uses the second NN filter model for a second video unit in a second temporal layer, and wherein the first temporal layer is a higher temporal layer than the second temporal layer.

8. The method of claim 7, wherein the first depth is 8.

9. The method of claim 1, wherein the NN filter uses the first NN filter model for a first video unit in an inter slice, and wherein the NN filter uses the second NN filter model for a second video unit in an intra slice.

10. The method of claim 9, wherein the first depth is 8 and wherein the second depth is 32.

11. The method of claim 1, wherein the depth of a NN filter model to be used is sent to the decoder using one selected from at least one of a supplemental enhancement information (SEI) message, a sequence parameter set (SPS), a picture parameter set (PPS), an adaptation parameter set (APS), a video parameter set (VPS), a picture header, or a slice header.

12. The method of claim 1, wherein the depth of the first NN filter model is sent to the decoder for a first video unit, and the depth of the second NN filter model is sent to the decoder for a second video unit.

13. The method of claim 1, wherein the unfiltered sample comprises a luma component and a chroma component, and wherein a different depth is signaled to a decoder for the luma component than for the chroma component.

14. The method of claim 1, wherein the NN filter is one or more selected from at least one of an adaptive loop filter, a deblocking filter, or a sample adaptive offset filter.

15. The method of claim 1, wherein the conversion comprises generating the bitstream according to the video media file.

16. The method of claim 1, wherein the conversion comprises parsing the bitstream to obtain the video media file.

17. The method of claim 1, wherein the depth of a NN filter model to be used is signaled to a decoder.

18. An apparatus for coding video data comprising a processor and a non-transitory memory with instructions thereon, wherein the instructions upon execution by the processor cause the processor to:

apply a neural network (NN) filter to an unfiltered sample of a video unit to generate a filtered sample, wherein the NN filter is based on a first NN filter model having a first depth, or a second NN filter model having a second depth, wherein the depth comprises a number of residual blocks of the respective NN filter model, and wherein the second depth is different than the first depth; and convert between a video media file and a bitstream based on the filtered sample, wherein the NN filter uses the first NN filter model for a first video unit in a first temporal layer or a first type of slice, and wherein the NN filter uses the second NN filter model for a second video unit in a second temporal layer or a second type of slice, and wherein the NN filter uses the first NN filter model for a third video unit in a third temporal layer, wherein the first temporal layer and the third temporal layer are in a same subgroup of temporal layers, and wherein the second temporal layer is in a different subgroup of temporal layers.

19. Method for storing a bitstream of a video, comprising:

applying a neural network (NN) filter to an unfiltered sample of a video unit to generate a filtered sample, wherein the NN filter is based on a first NN filter model having a first depth, or a second NN filter model having a second depth, wherein the depth comprises a number of residual blocks of the respective NN filter model, and wherein the second depth is different than the first depth;

generating the bitstream based on the filtered sample; and storing the bitstream in a non-transitory computer readable medium, wherein the NN filter uses the first NN filter model for a first video unit in a first temporal layer or a first type of slice, and wherein the NN filter uses the second NN filter model for a second video unit in a second temporal layer or a second type of slice, and wherein the NN filter uses the first NN filter model for a third video unit in a third temporal layer, wherein the first temporal layer and the third temporal layer are in a same subgroup of temporal layers, and wherein the second temporal layer is in a different subgroup of temporal layers.

* * * * *